US007495813B2

(12) United States Patent
Akiyama et al.

(10) Patent No.: US 7,495,813 B2
(45) Date of Patent: Feb. 24, 2009

(54) OPTICAL SCANNING DEVICE AND IMAGE FORMING APPARATUS

(75) Inventors: Hiroshi Akiyama, Kanagawa (JP);
Yoshinori Hayashi, Kanagawa (JP);
Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 181 days.

(21) Appl. No.: 11/397,571

(22) Filed: Apr. 5, 2006

(65) Prior Publication Data
US 2006/0245009 A1    Nov. 2, 2006

(30) Foreign Application Priority Data
Apr. 7, 2005    (JP) .............................. 2005-111297

(51) Int. Cl.
*G02B 26/08* (2006.01)
(52) U.S. Cl. ....................................... 359/204
(58) Field of Classification Search ......... 359/204–206, 359/212, 213, 216
See application file for complete search history.

(56) References Cited

U.S. PATENT DOCUMENTS

| 2004/0141219 | A1* | 7/2004 | Ono et al. ................... 359/204 |
| 2006/0245009 | A1  | 11/2006 | Akiyama et al. |

FOREIGN PATENT DOCUMENTS

| JP | 2657769 | 6/1997 |
| JP | 2722314 | 11/1997 |
| JP | 2924200 | 5/1999 |
| JP | 2003-98459 | 4/2003 |
| JP | 3445691 | 6/2003 |
| JP | 3543473 | 4/2004 |

OTHER PUBLICATIONS

U.S. Appl. No. 11/756,166, filed Jun. 19, 2007, Nakajima.
U.S. Appl. No. 11/844,643, filed Aug. 24, 2007, Saisho, et al.
U.S. Appl. No. 11/782,268, filed Jul. 24, 2007, Ichii, et al.
U.S. Appl. No. 11/397,571, filed Apr. 5, 2006, Akiyama, et al.
U.S. Appl. No. 11/451,486, filed Jun. 13, 2006, Nakajima, et al.
U.S. Appl. No. 12/021,850, filed Jan. 29, 2008, Watanabe, et al.
U.S. Appl. No. 12/020,292, filed Jan. 25, 2008, Miyatake, et al.
U.S. Appl. No. 12/028,446, filed Feb. 8, 2008, Nakamura, et al.
U.S. Appl. No. 12/051,404, filed Mar. 19, 2008, Amada, et al.
U.S. Appl. No. 12/024,505, Feb. 1, 2008, Watanabe, et al.
U.S. Appl. No. 12/031,362, filed Feb. 14, 2008, Arai, et al.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A vibration mirror used in an optical scanning device has two reflection surfaces on opposite sides. A pair of light beams corresponding to a pair of different colors are irradiated on one reflection surface and another pair of light beams corresponding to another pair of different colors are irradiated on other reflection surface. If there are fluctuations in dimensions or a change in temperature, because the vibration mirror is one, all the colors are subjected to the same influences.

22 Claims, 13 Drawing Sheets

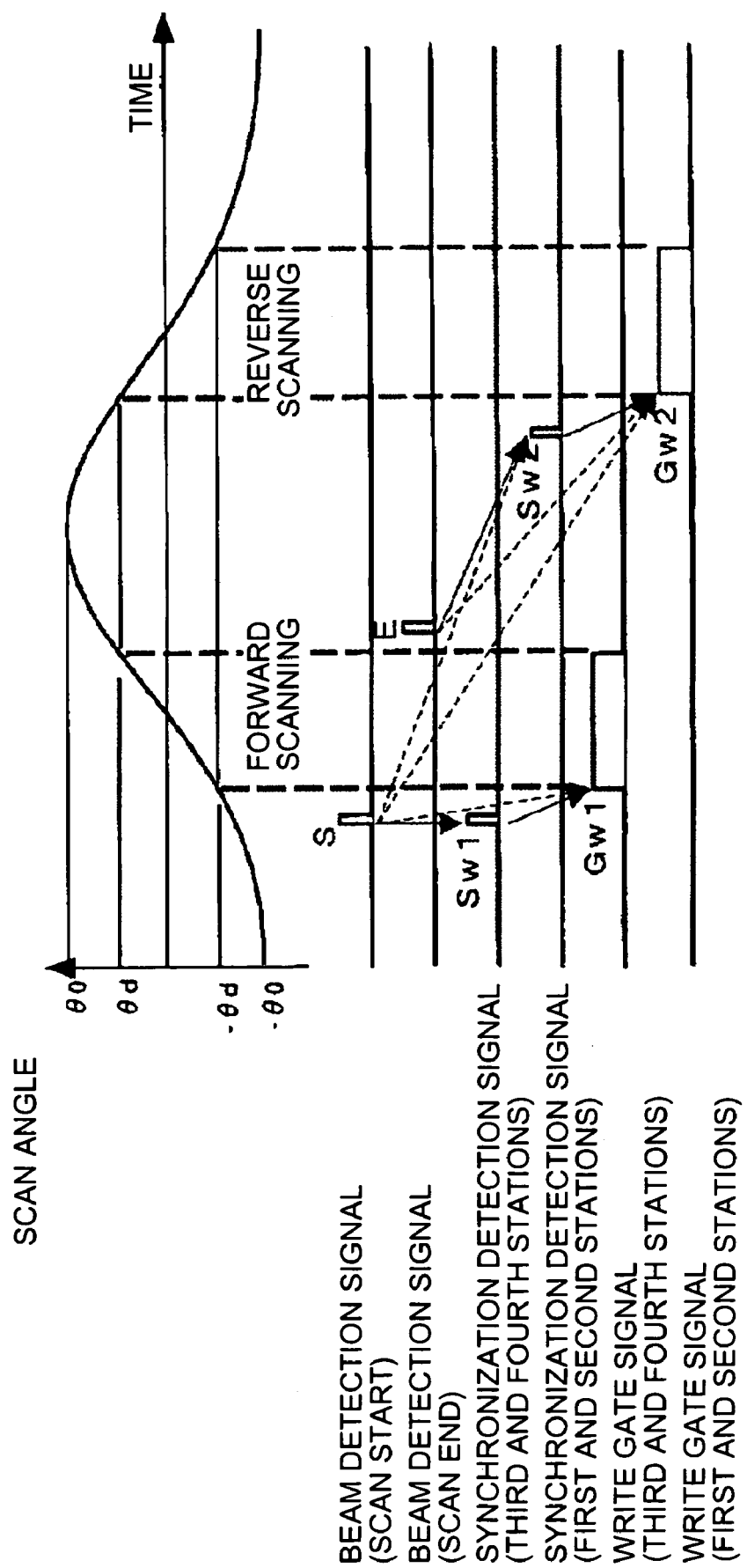

OPTICAL SCANNING DEVICE AND IMAGE FORMING APPARATUS

CROSS-REFERENCE TO RELATED APPLICATIONS

The present document incorporates by reference the entire contents of Japanese priority document, 2005-111297 filed in Japan on Apr. 7, 2005.

BACKGROUND OF THE INVENTION

1. Field of the Invention

The present invention relates to an optical scanning device and an image forming apparatus such as a digital copier and a laser printer that includes the optical scanning device.

2. Description of the Related Art

Examples of deflectors used in conventional optical scanning devices for scanning a target surface with light include a polygon mirror and a galvanometer mirror. To achieve higher-resolution images and higher-speed printing, the mirror needs to be rotated at higher speed. This raises issues such as wear-out of bearings, generation of heat due to windage loss, and generation of noise, which puts a limit on high-speed scanning.

Recently, to address such issues, studies have been conducted on deflectors produced by use of silicon micromachining. Japanese Patent No. 2722314, for example, discloses a system in which a vibration mirror and a twisting member that supports the vibration mirror are integrally formed on a Si substrate.

According to the technology disclosed in Japanese Patent No. 2722314, the size of the mirror surface can be reduced, which leads to reduction in the overall size of the device. In addition, because resonance is used to creates reciprocal vibration, high-speed operations can be realized while suppressing noise and power consumption.

Japanese Patent No. 3445691, for example, discloses a technology in which a vibration mirror is provided in place of a polygon mirror.

Japanese Patent Application Laid-open No. 2003-98459 discloses a technology for applying the technology of Japanese Patent No. 3445691 to an optical scanning device in a tandem image forming apparatus. According to the technology disclosed in Japanese Patent Application Laid-open No. 2003-98459, several vibration mirrors arranged and they are driven at a common scanning frequency. The resonance frequencies, however, may not always coincide because of the moment of inertia of the vibrating units and the spring constant of the twisting members, which tend to vary due to the fluctuations in dimensions caused during the producing process.

In response to this problem, an example in which displacement can be detected is proposed (see, for example, Japanese Patent No. 2657769).

Because each vibration mirror is individually driven, if the resonance frequencies do not coincide with one another, scan line pitches become uneven, resulting in displacement of the scanning lines that occurs gradually from the starting point to the end point in the sub-scanning direction. In addition, if the center of each vibration amplitude does not coincide with others, scale factors, or dot densities, vary among areas that are divided along the main scanning direction. This causes displacements of registers and unevenness in density among images of different colors, resulting in color shifts and discoloration. Thus, the image quality is degraded.

As the scanning frequency increases in accordance with scanning speed enhancement, the scan angle may be unable to catch up with the speed. Another limit is that the variation amount of the rotation angle per unit time drastically decreases in accordance with sinusoidal vibration as the scan angle nears its peak. For this reason, only about a half the entire scan angle can be effectively used when trying to achieve even dot intervals on the scanned surface.

Moreover, it is preferable to have a smaller image formation spot diameter to bring the shape of the latent image potential distribution closer to a rectangular and thus improve the resolution and maintain the evenness of the dot diameters. However, a gauss beam, in general, has image formation properties that $\omega 0/\omega$ is proportionate to the focus distance f of the image formation lens, where the diameter of beam incident on the image formation lens is represented as $\omega 0$ and the diameter of the image formation spot is represented as $\omega$. This means that, when the angle of field becomes small with an insufficient scan angle, the focus distance f of the image formation lens inevitably becomes greater. To shrink the spot, the diameter of the beam $\omega 0$ needs to be increased, which means the mirror surface needs to be increased. For this reason, the situation is becoming more difficult to ensure a sufficient scan angle.

FIG. 18 is a perspective of a typical movable mirror.

A movable mirror shaped like a simple plate as shown in FIG. 18 will be considered. The dimensions of the movable mirror are determined as 2r in width in a direction parallel to the rotational axis, d in width in a direction orthogonal to the rotational axis, and t in thickness. The dimensions of each twisting member are determined as h in length, and a in width. When the density of Si is $\rho$, and the material constant is G, the moment of inertia $I=(4\rho r dt/3) \cdot r2$ spring constant $K=(G/2h) \cdot \{at(a2+t2)/12\}$ Thus, the resonance frequency f0 is:

$f0=(½\pi) \cdot \nu(K/I)=(½\pi) \cdot \nu\{Gat(a2+t2)/24LI\}$

The length of the twisting member L is almost proportional to the scan angle $\theta$, and thus the scan angle $\theta$ can be expressed by:

$$\theta=\kappa/I \cdot f02 \text{ where } \kappa \text{ is a constant} \quad (1)$$

This means that the scan angle $\theta$ is inverse proportional to the moment of inertia I, and to increase the resonance frequency f0, the moment of inertia I must be reduced, or otherwise the scan angle $\theta$ would decrease. In other words, if 2r, width in a direction parallel to the rotational axis, is simply increased, the scan angle $\theta$ would decrease in inverse proportion to the cube of the magnification factor.

On the other hand, the relationship between the torque T and the scan angle $\theta$ can be expressed by:

$$\theta=\kappa' \cdot T/K \text{ where } \kappa' \text{ is a constant} \quad (2)$$

This means that the scan angle $\theta$ can maintained at a constant value by adjusting the torque T.

When such a mirror is to be used in an optical scanning device of a tandem image forming apparatus, it is necessary to arrange more than one mirrors and drive them at a common frequency.

With the conventional technology, fluctuations in resonance frequencies that appear by fluctuations in dimensions during the producing process can be minimized to some extent by screening or with the method as described above. It is still difficult, however, to make the resonance frequencies exactly match. Furthermore, because the resonance frequencies also vary in accordance with the spring constant that varies due to the temperature changes, the scan angle decrease caused by fluctuations in a corresponding resonance frequency has to be compensated by an increase in the torque.

In the current situation in which of an image formation spot having a smaller diameter is demanded as a higher image quality is required, the mirror surface size cannot help but be increased. Therefore, the measures that use an increased torque for compensation are becoming less effective.

For the above reasons, a system that does not require multiple vibration mirrors, or a system that needs a single vibration mirror, is now in demand. Nevertheless, individual control of the starting positions between the opposing stations, which is enabled only with multiple vibration mirrors, will no longer be possible with a single mirror. The single-mirror system needs to be configured to suppress image quality degradation including color shifts and discoloration, without depending on such a control even when the scan angle varies.

SUMMARY OF THE INVENTION

It is an object of the present invention to at least solve the problems in the conventional technology.

According to an aspect of the present invention, an optical scanning device includes a plurality of light sources; a deflecting unit that includes a vibration mirror that has two reflective surfaces including a first reflective surface and a second reflective surface, wherein a normal drawn to the first reflective surface face in opposite direction to a normal drawn to the second reflective surface face, the first reflective surface deflects light beams from a first set of light sources among the light sources and the second reflective surface deflects light beams from a second set of light sources among the light sources; and an image formation optical system that reflects each of the light beams deflected by the deflecting unit to scan a scanning area corresponding to each light beam.

According to another aspect of the present invention, an image forming apparatus includes the above optical scanning device, wherein the beams emitted from the light sources and modulated with an image signal are deflected to form an image in a spot pattern by the image formation optical system, an image carrier is scanned to record an electrostatic image thereon, and the electrostatic image is developed with a toner and transferred onto a recording medium.

According to still another aspect of the present invention, an image forming apparatus includes the above optical scanning device; an image carrier corresponding to each light beam, each image carrier having the scanning area corresponding to each light beam and records an electrostatic image corresponding to the light beam; a developing device that develops the electrostatic images on the image carriers with toners of different colors; and a transferring device that superimposes developed toner images developed by the developing device and transfers the developed toner images onto a recording medium, wherein the images are recorded in such a manner that write starting positions on the image carriers are aligned in a main scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a timing chart for generation of timing signals for the start timing of each writing, based on a synchronization detection signal;

DETAILED DESCRIPTION OF THE PREFERRED EMBODIMENTS

Exemplary embodiments of the present invention are explained below with reference to the accompanying drawings.

Figure 1:
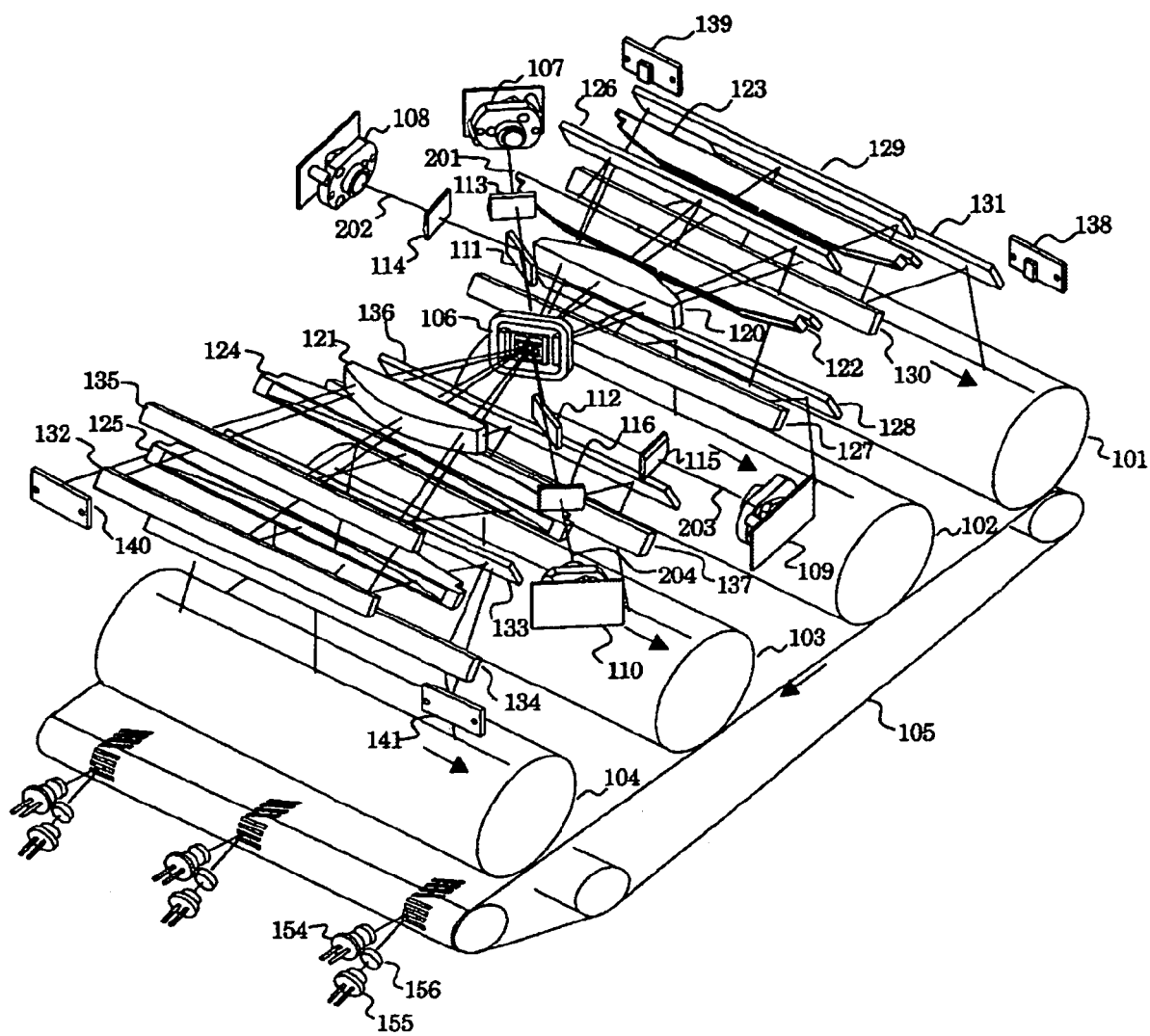
FIG. 1 is perspective for explaining a first embodiment according to the present invention.

FIG. 1 is a perspective for explaining a first embodiment according to the present invention.

Reference numerals 101 through 104 in the drawing designate photosensitive drums that are to be scanned, 105 designates a transfer belt, 106 designates a vibration mirror module (hereinafter, "vibration mirror"), 107 through 110 designate light source units, 111 and 112 designate incident mirrors, and 113 through 116 designate cylinder lenses. Other reference numerals will be referred to in the explanation where they appear.

The optical scanning device shown in FIG. 1 corresponds to a tandem image forming apparatus having four stations. The stations are divided into two two-station groups. Beams are projected on a single-body vibration mirror in which the reflective surfaces are arranged back-to-back in opposite directions, and deflected for scanning. The single-body vibration mirror may have a structure in which reflective surfaces are provided on both sides of a single plate member, or a structure in which two plate members each having a reflective surface on one side are combined by, for example, pasting them together on the non-reflective surfaces. The details will be given below.

Figure 2A:
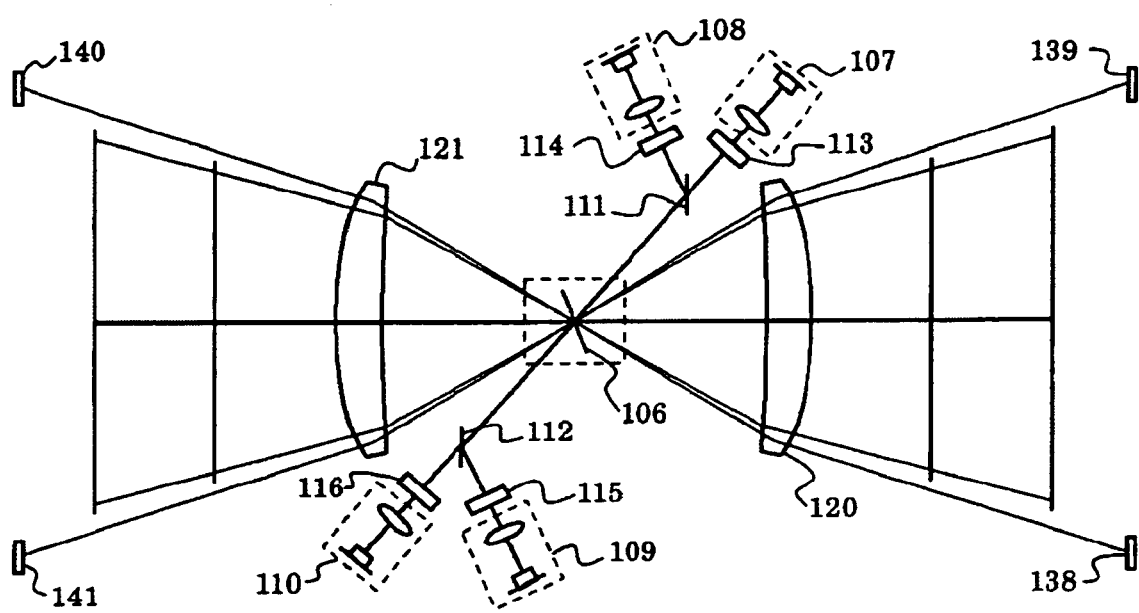
FIGS. 2A and 2B are schematic views of the structure of FIG. 1 along a main scanning direction and a sub-scanning direction.
Figure 2B:
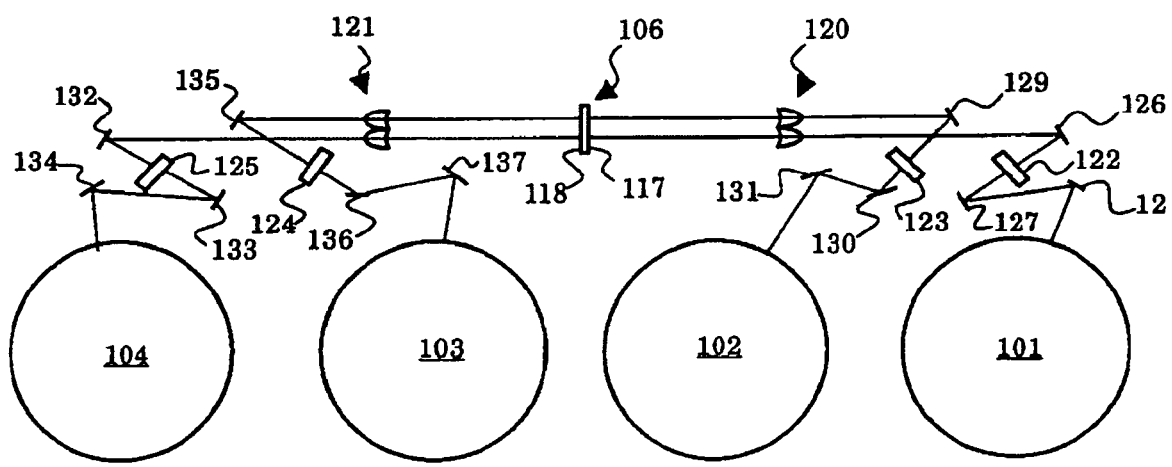

FIGS. 2A and 2B are schematic views of the structure of FIG. 1 in a main scanning direction and a sub-scanning direction, respectively. FIG. 2A is a plan view for explaining scanning in the main scanning direction, while FIG. 2B is a side view for explaining scanning in the sub-scanning direction.

Reference numerals 117 and 118 in the drawing designate the two reflective surfaces of the vibration mirror 106.

The following explanation will be given with reference to FIGS. 1, 2A and 2B.

The four photosensitive drums 101, 102, 103, and 104 are arranged at regular intervals in a direction of movement of the transfer belt 105. A color image is formed by sequentially transferring and overlaying toner images of different colors formed on the photosensitive drums 101, 102, 103, and 104.

The optical scanning device for scanning each photosensitive drum is integrally constituted, and the scanning operation is performed by moving a beam emitted from a corresponding light source unit with an individually arranged movable mirror.

Each of the light source units 107, 108, 109, and 110 includes a semiconductor laser (LD) as a light source, a coupling lens for coupling the light diffusing from the LD so as to impart a predetermined diffusion tendency (diffusion light, parallel light, or convergent light), and a supporting mechanism that supports the LD and the lens.

The light source units 107 and 109 are arranged in such a manner that their incident positions have an optical axis that is lower by a predetermined length, or approximately 4 millimeters according to the first embodiment, than the incident positions of the light source units 108 and 110. Furthermore, the light source units 107, 108, 109, and 110 are arranged at rotationally symmetrical positions with respect to the rotational axis of the movable mirror in such a manner that the deflection direction of the beams 201 and 202 projected from the light source units 107 and 108 will be opposite to the deflection direction of the beams 203 and 204 projected from the light source units 109 and 110. Scanning lenses 120 and 121, and toroidal lenses 122, 123, 124, and 125 arranged for corresponding beams cause the beams moved by the vibration mirror 106 to form an image in spot form on a corresponding photosensitive drum of magenta, yellow, black, or cyan, and write the image at the same time. Fundamentally, the optical axes of the scanning lenses are arranged to coincide with those of the toroidal lenses so that the beams pass through the center of the image with respect to the main scanning direction.

The vibration mirror 106 is arranged so that its rotational axis also coincides with the optical axes of the scanning lenses 120 and 121. Three reflection mirrors are provided in one station so that the optical paths from the vibration mirror 106 to each of the surfaces of the photosensitive drums 101 to 104 have the same length and that the beams incident on the photosensitive drums, which are arranged at regular intervals, have the same incident positions and same incident angle.

The beams deflected in directions opposite to each other have reversed scanning phases with respect to each other. In the main scanning direction described in FIG. 2A, scanning from top down with the beams projected from the light source units 107 and 108 will be referred to as forward scanning, and scanning from bottom up will be referred to as reverse scanning. The light source units 107 and 108 perform optical writing only during the forward scanning, while the light source units 109 and 110 perform optical writing only during the reverse scanning. The scanning directions can thereby coincide with each other at the time of writing onto each drum.

Another writing process is possible in which an image can be sufficiently formed by writing during either the forward scanning or the reverse scanning only, by reversing line pixel data in the opposite direction thereto.

Furthermore, when writing on all the photosensitive drums during the forward and reverse scanning, an image can be sufficiently formed by reversing the line pixel data at each light source between the forward and reverse scanning and writing the data in, while maintaining the relationship that the line pixel data is reversed in opposite directions.

The cylinder lenses 113, 114, 115, and 116 each have a planar surface on one side and a curved surface on the other side having a common curvature with respect to the sub-scanning direction. The lenses are positioned so that the optical paths have the same length up to the deflection point of the reflective surface 117 or 118. All the beams are converged to be linear in the main scanning direction in the vicinity of the deflection surface. An optical face tangle error correction system is constituted by the cylinder lenses 113 to 116 and the toroidal lenses 122 to 125 that are discussed later, bringing the deflection point and the photosensitive surface into the conjugate relationship with respect to the sub-scanning direction.

The vibration mirror 106 is provided in the center of the optical scanning device and includes a movable unit which has reflective surfaces on both sides. The vibration mirror 106 further includes two mirror units that are attached or formed so as to have a predetermined length therebetween in the sub-scanning direction, or a single mirror unit incorporating an equivalent of two mirror units. The beams projected from the light source units 107 and 108 are incident on the reflective surface 117, while the beams projected from the light source units 109 and 110 are incident on the reflective surface 118. The vibration mirror 106 stops at a neutral position during a stationary state. A normal to the reflective surfaces during the stationary state will be referred to as a neutral-position normal. The neutral-position normal has an angle θ in the main scanning direction with respect to the optical axis of the scanning lenses 120 and 121. According to the first embodiment, θ=30°.

The movable unit of the vibration mirror 106 is formed with a Si substrate as discussed below, and generally, the two reflective surfaces are parallel to each other.

The beams 201, 202, 203, and 204 emitted by the light source units are to form an incident angle of 30° in the main scanning direction from the neutral-position normal of the reflective surface 117 or 118 of the vibration mirror 106. To realize this, the beams 202 and 203 from the light source units 108 and 109 are reflected by the incident mirrors 111 and 112, respectively, and aligned in the main scanning direction with the optical paths of the beams 201 and 204 from the light source units 107 and 110, which directly travel to the movable mirror. Then, the beams are incident onto the reflective surfaces 117 and 118 of the movable mirrors from directions symmetrical with respect to the rotation axis at an incident angle θ (=30°).

The optical components are arranged so that the light reflected off the vibration mirror at its neutral position coincides with the optical axis of the scanning lens. In other words, the beams 202 and 203 from the light source units 108 and 109 are deflected by the incident mirrors 111 and 112 and aligned in the main scanning direction with the optical paths of the beams 201 and 204 from the light source units 107 and 110, which travel directly to the vibration mirror, to be incident horizontally onto the vibration mirror. As a result, each of the beams 201, 202, 203, and 204 emitted from the light source units forms an incident angle θ in the main scanning direction to the corresponding neutral-position normal of the vibration mirror. Further, the beam from each light source unit is configured to be incident substantially toward the rotational axis of the vibration mirror from outside the scanning region.

It is possible to have a structure in which the optical axes of beams from different light sources that are incident from the same direction onto a reflective surface of the vibration mirror do not coincide with each other in the main scanning direction. It is also possible to have a structure in which the beams incident on the reflective surfaces on the opposite sides have different incident angles in the main scanning direction. In the tandem system, however, in which images recorded on different photosensitive drums are overlaid, the above explained arrangement realizes a greater effective scan width.

The scanning lenses are arranged in symmetrical positions with respect to the rotational axis of the movable unit so as to face each other and have the optical axes parallel to each other.

The scanning lenses 120 and 121 are prepared by integrally forming a double-layered structure or combining two layers together so as to be shifted for a distance corresponding to the vertical distance between the positions of the beams 201 and 202 on the vibration mirror 106. Furthermore, the scanning lenses 120 and 121 have a non-arc surface and are provided with power in the main scanning direction so as to have f·arc sin characteristics in response to the sinusoidal vibration of the vibration mirror, or in other words, characteristics that a scanning distance per unit scan angle $dH/d\theta$ is proportional to $\sin^{-1}(\theta/\theta 0)$. Thus, the beams can travel on the photosensitive surface at substantially constant speed, in accordance with the rotation of the vibration mirror. On the other hand, the scanning lenses 120 and 121 are not provided with power in the sub-scanning direction, and thus can be shared by the beams, regardless of their incident positions or incident angles.

After passing through the scanning lenses, the beams form images on the photosensitive surfaces in spot form by way of the toroidal lenses 122, 123, 124, and 125 arranged in correspondence to individual beams, and latent images are recorded.

The optical path for each station will be explained, by following its course.

The beam 201 emitted from a light source unit 1078 passes through the cylinder lens 113 and is deflected by the upper step of the reflective surface 117 of the vibration mirror. Then, the beam 201 passes through the upper layer of the scanning lens 120, is reflected by the reflection mirror 126, passes through the toroidal lens 122, is reflected by the reflection mirrors 127 and 128 to be guided to the photosensitive drum 102, which is the second station, where a latent image is formed based on the image information for magenta.

The beam 202 emitted from the light source unit 108 passes through the cylinder lens 114, is reflected by the incident mirror 111 and deflected by the lower step of the reflective surface 117 of the vibration mirror. Then, the beam 202 passes through the lower layer of the scanning lens 120, is reflected by the reflection mirror 129, passes through the toroidal lens 123, and is reflected by the reflection mirrors 130 and 131 to be guided to the photosensitive drum 101, which is the first station, where a latent image is formed based on the image information for yellow.

A similar process is conducted for the stations arranged symmetrically with respect to the vibration mirror 106. The beam 203 from the light source unit 109 is deflected, via the incident mirror 112, by the lower step of the reflective surface 118 of the vibration mirror, and reflected by the reflection mirrors 132, 133, and 134 to be guided to the photosensitive drum 104, which is the fourth station, where a latent image is formed based on the image information for black. In addition, the beam 204 from the light source unit 110 is deflected by the upper step of the reflective surface 118 of the vibration mirror and reflected by the reflection mirrors 135, 136, and 137 to be guided to the photosensitive drum 103, which is the third station, where a latent image is formed based on the image information for cyan.

All the components are integrally retained in a single housing that is not shown.

In FIGS. 2A and 2B, reference numerals 138, 139, 140, and 141 each designate a board for mounting a synchronization detection sensor and an end detection sensor. A set of two sensors is provided for a pair of stations that face to each other to detect a beam in front and back of a scanning region. A synchronization detection signal is generated based on detection signals from the synchronization detection sensors 139 and 141 in forward scanning. In reverse scanning, a synchronization detection signal is generated based on detection signals from the end detection sensors 138 and 140. The timing of starting writing is thereby determined.

The structure may eliminate, for instance, synchronization detection sensors 138 and 139. In this case, the synchronization detection signal for determining the timing of starting writing images at the third and the fourth stations are generated with reference to the detection signal of the synchronization detection sensor 140. This synchronization detection signal is delayed by a half cycle of the scanning frequency fd of the vibration mirror 106, $1/(2 \cdot fd)$, to generate a synchronization detection signal for determining the timing of starting writing images at the opposing pair of first and second stations. In this fashion, images are written at the third and the fourth stations in the forward scanning of the vibration mirror 106, while images are written at the first and the second stations in the reverse scanning of the vibration mirror 106.

According to the first embodiment, the scanning lens is configured to have a two-layered structure. However, a single-layered scanning lens may be adopted.

In addition, a single light source is provided for each drum according to the first embodiment. However, more than one light source may be provided for each drum, in a similar manner to a device incorporating a polygon mirror.

FIG. 3 is a timing chart for explaining generation of write start timing signals, based on one of the synchronization detection signals.

Symbol "S" in the drawing designates a detection signal generated by the synchronization detection sensor 140, symbol "E" designates a detection signal generated by the synchronization detection sensor 141, symbols "Sw1" and "Sw2" designate write synchronization signals, symbols "Gw1" and "Gw2" designate write gate signals, θ0 designates maximum scan angle (on one side), and θd designates an actual scan angle range (on one side). Arrows in the drawing indicate the relationship of signal generation.

In response to the detection signal S generated by the synchronization detection sensor 140 at the leading end of scanning, a write synchronization signal Sw1 is generated for the third and the fourth stations. The signal S and the signal Sw1 are generally determined to have the same timing. However, a specific time difference may be set, if necessary, by taking a count with a reference clock.

Generally, a write gate signal Gw1 is generated a predetermined period of time after the signal Sw1. However, because the signal S and the signal Sw1 have practically the same timing, the signal Gw1 may be generated from the signal S.

In response to a detection signal E generated by the synchronization detection sensor 141 at the trailing end of scanning, a write synchronization signal Sw2 is generated for the first and the second stations. The signal Sw2 may also be generated from the signal S, although the two signals are away from each other in terms of time.

A write gate signal Gw2 is generated from the signal Sw2. In a similar manner to the above, the signal Gw2 may be generated from the signal S or the signal E.

A detection signal is generated by the synchronization detection sensor 141 at the trailing end of the scanning so that a detection time difference with respect to the detection signal generated by the synchronization detection sensor 140, namely the beam scanning time t, can be detected. This allows the fluctuation of the scan angle θ0 of the movable mirror to be detected.

When the scan angles θsnc for which the scan beams are detected by the synchronization detection sensor and the end detection sensor have the same absolute value, θsnc can be expressed as follows:

$$\theta snc = 2\theta 0 \cdot \sin(2\pi fd \cdot t/2) = 2\theta 0 \cdot \sin(\pi fd \cdot t)$$

Because θsnc is constant, the maximum scan angle θ0 can be obtained by detecting the scanning time t.

A detecting unit is arranged at an exit roller of the transfer belt 105 to detect the overlay precision of images of different colors overlaid at the corresponding stations. The detecting unit reads the detection pattern of the toner image formed on the transfer belt 105 and detects misalignment with reference to a station including the main scanning register and the sub-scanning register as from the reference station, for which correction control is performed at regular intervals.

The detecting unit according to the first embodiment includes a LED device 154 for lighting, a photosensor 155 for receiving reflection light, and a pair of condenser lenses 156. Three of the units are arranged at the left and right ends and in the center of an image to read a detection time difference with respect to black, which is the reference color, in accordance with the movement of the transfer belt.

Figure 4:
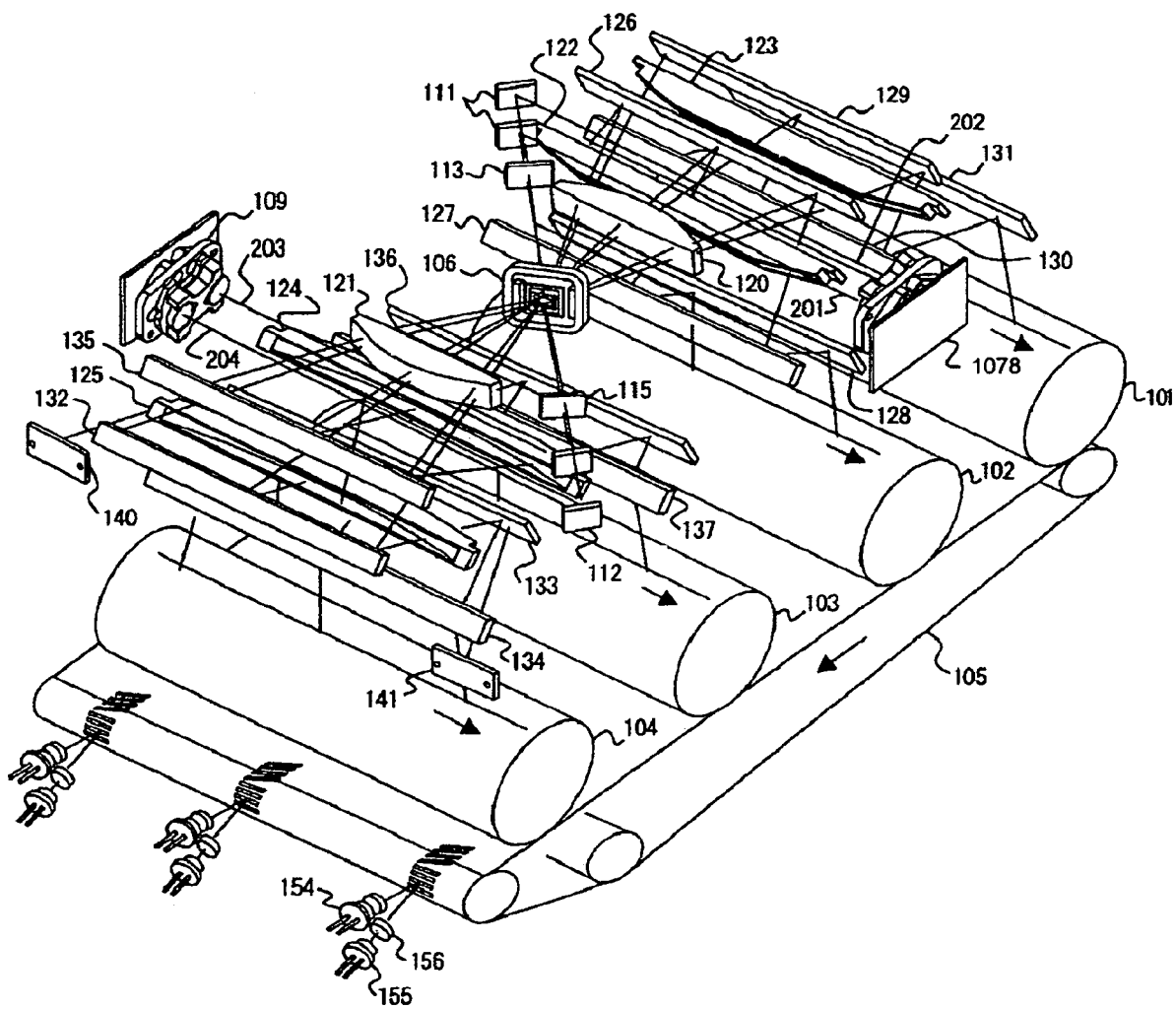
FIG. 4 is a diagram of a structure in which the light source units for every two stations that are facing to each other are integrated into one unit.

FIG. 4 is a diagram of a structure in which the light source units for every two stations that are facing to each other are integrated into one unit.

The light source unit 107B has a structure in which the light sources 107 and 108 described in FIG. 1 are integrated into one unit. This arrangement allows the structure up to the deflection mirror to be slightly minimized. The light source unit 109 is constituted likewise.

The beam incident positions of the light source units 107 and 109 are separated by a predetermined distance in the main scanning direction and in the sub-scanning direction. The optical paths are brought onto the same sub-scanning cross-sectional surface by the incident mirrors 111 and 112.

Figure 5A:
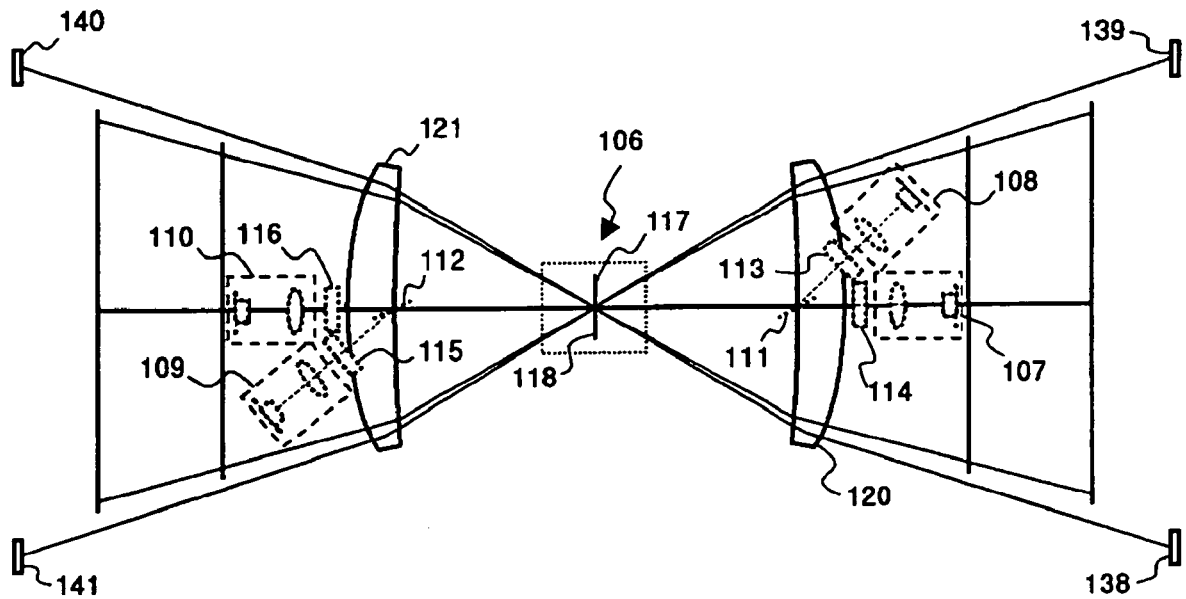
FIGS. 5A through 5C are diagrams for explaining variants of the first embodiment.
Figure 5B:
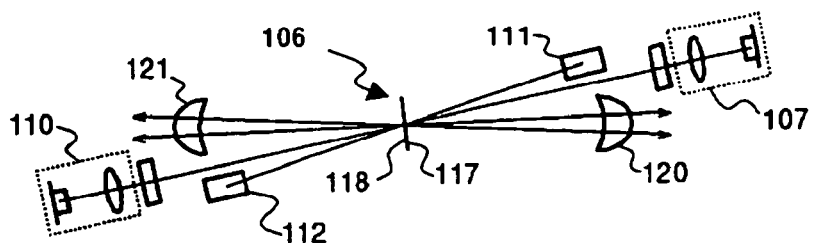
Figure 5C:
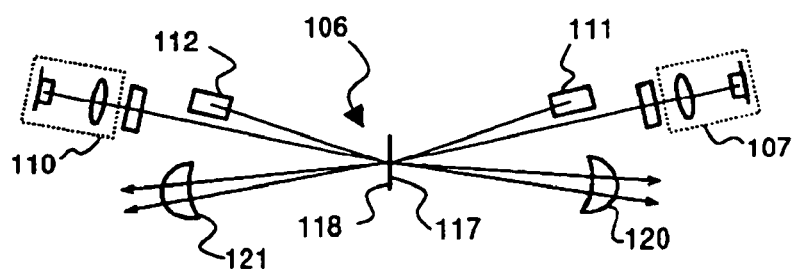

FIGS. 5A through 5C are diagrams for explaining variants of the first embodiment. Precisely, FIG. 5A is a plan view of a structure in the main scanning direction; FIG. 5B is a sectional view of the structure in the sub-scanning direction; and FIG. 5C is a sectional view of a structure in the sub-scanning direction according to the variants of the first embodiment.

An optical system downstream after the scanning lenses is omitted in FIGS. 5B and 5C.

The scanning lenses 120 and 121 are arranged opposite to each other with respect to the vibration mirror 106 so that the optical axes of the scanning lenses 120 and 121 coincide with the neutral-position normal of the vibration mirror 106. In other words, when viewed from the main scanning direction, the system is configured in such a manner that the beam incident onto the vibration mirror 106 hits the mirror, when it is in the stationary state, from the front. When the beam is incident on the vibration mirror 106, it is tilted in the sub-scanning direction so as not to be diverted by the vibration mirror 106. The arrangement of the light source units 107 through 110 is adjusted so that the latent images formed by the cylinder lenses 113 through 116 will coincide with one another on the surface of the vibration mirror 106. In the structure illustrated in FIG. 5B, the vibration mirror is arranged at a certain angle in the sub-scanning direction, and the scanning lenses are arranged opposite to each other in a horizontal direction. In the structure illustrated in FIG. 5C, the vibration mirror is arranged upright, and the scanning lenses are arranged to form a certain angle with respect to the normal of the vibration mirror.

The optical system downstream of the scanning lenses is substantially the same as the first embodiment described in FIG. 1.

As described above, a structure having any angle between the reflective surface of the movable mirror and the main scanning direction can be adopted, as far as the components are arranged in such a manner that the optical paths of the beams projected from the light source units to the movable mirror are aligned on the cross-sectional surface in the sub-scanning direction that includes the rotational axis of the movable mirror.

FIGS. 6A through 6D are diagrams for explaining examples as to how the optical axes of beams incident on the vibration mirrors can be arranged with respect to the sub-scanning direction.

Figure 6A:
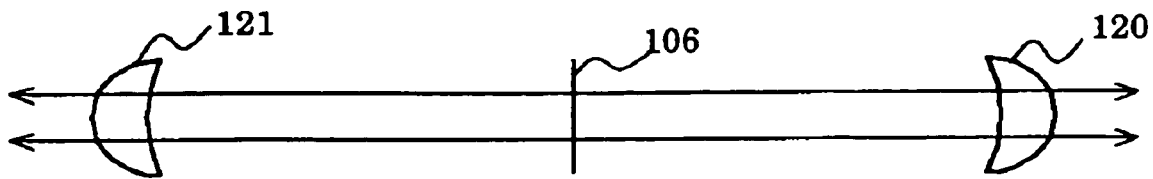
FIGS. 6A through 6D are diagrams for explaining examples as to how the optical axes of beams incident on the vibration mirrors can be arranged with respect to the sub-scanning direction.
Figure 6B:
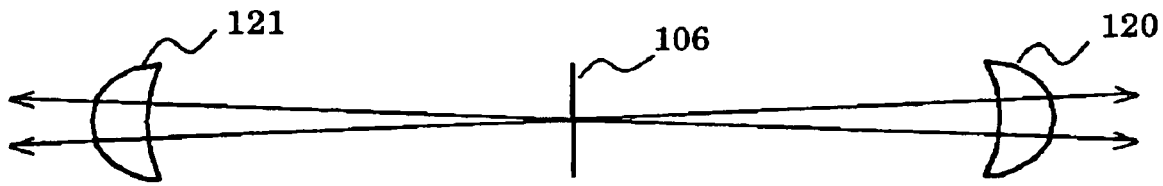
Figure 6C:
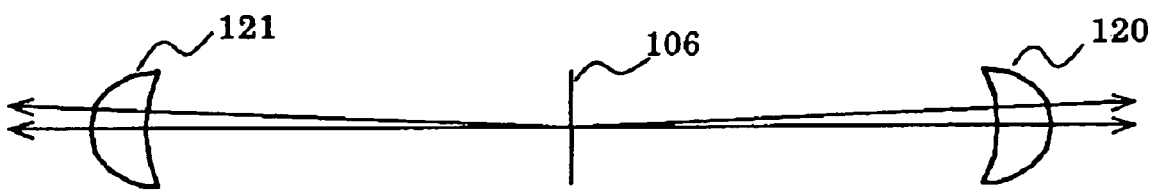
Figure 6D:
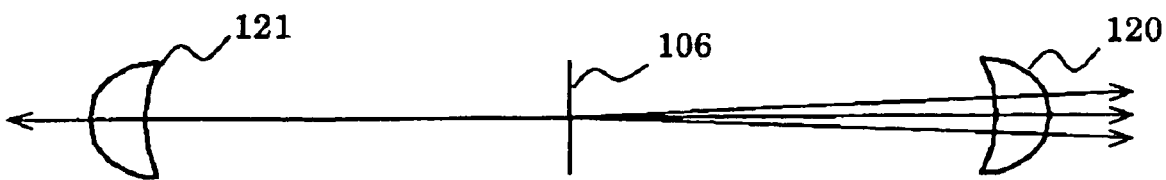

These examples are applicable to the first embodiment described in FIG. 1 and the variants of first embodiment described in FIG. 5. FIG. 6A is a diagram where it is applied to the first embodiment in FIG. 1. FIG. 6B is a diagram explaining an example where light source units are arranged so that the beams coincide with one another on the vibration mirror. All the beams are incident on the mirror at angles in the sub-scanning direction. FIG. 6C is a diagram explaining another example where light source units are arranged so that the beams coincide with one another on the vibration mirror. In this example, a beam that is not angled with respect to the sub-scanning direction is included. FIG. 6D is a diagram explaining an example where the number of beams incident on one side of the vibration mirror is different from the other side. In this drawing, three beams are incident on one side, while one beam is incident on the other. Although four examples are given here, any combination thereof may be feasible.

Detailed explanations will be given with reference to FIG. 6C.

Beams 201 and 203 emitted by the light source units 107 and 109 are incident at an angle of several degrees in the sub-scanning direction. The beams are deflected and incident on portions of the cylinder lenses 113 and 115 that are lower than their optical axes so that the beams will intersect on the reflective surfaces with the beams 202 and 204 that are projected vertically onto the reflective surfaces by the light source units 108 and 110.

The beams 201 and 203 that pass through the cylinder lenses travel obliquely upward. After being deflected by the movable mirror, the beams 201 and 203 switch their vertical positions with the beams 202 and 204, and thus the beams 201 and 203 run above the beams 202 and 204.

In this case, the cylinder lenses 113 and 115 are each shared by two beams. Because at least one of the two incident beams is deflected with respect to the optical axis, the emitted beams intersect with each other and become dispersed in the vicinity of the focus point in the focal distance. Hence, this example can be dealt with in a similar manner to the first embodiment and its variants by arranging the movable mirror in the vicinity of the focus point in the focal length.

Figure 7:
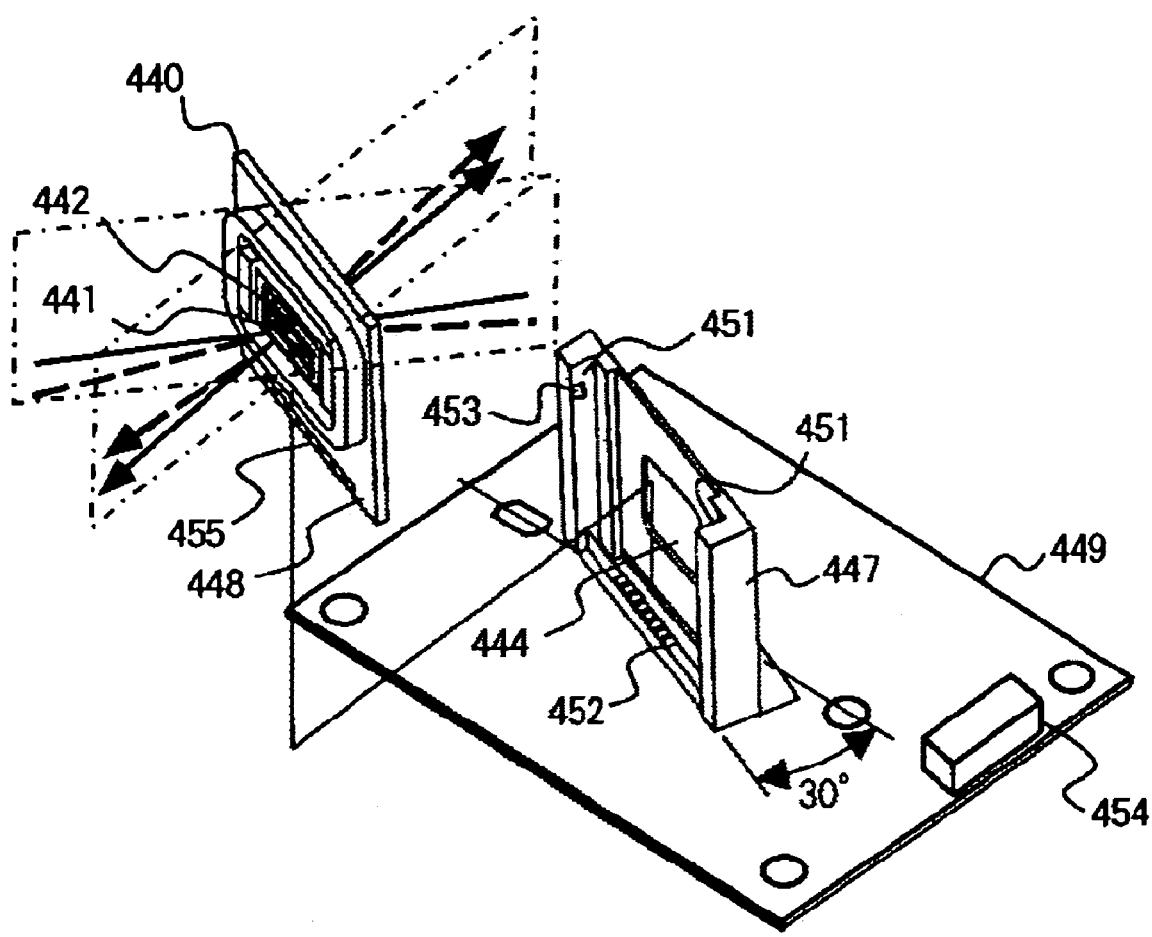
FIG. 7 is a perspective view of an optical scanning device according to a second embodiment of the present invention.

FIG. 7 is a perspective view of an optical scanning device according to a second embodiment of the present invention. The optical scanning device includes the vibration mirror module according to the first embodiment.

Reference numeral 440 designates a vibration mirror board, 441 designates a movable mirror, 442 designates a twisting member, 444 designates a through hole, 447 designates a supporting unit, 448 designates a mounting board, 449 designates a circuit board, 451 designates a position determining unit, 452 designates an edge connecting unit, 453 designates a retaining nail, 454 designates a connector, and 455 designates wiring terminals.

The second embodiment will be explained, taking an example of incorporating an electromagnetic drive system as a means for applying a torque to the movable mirror.

The movable mirror 441 is axially supported by the twisting member 442. The vibration mirror substrate 440 is prepared, as discussed below, by etching a single Si board to punch the outside shape out, and is mounted on the mounting board 448.

The supporting unit 447 is formed of a resin by molding, and is positioned in a predetermined location of the circuit board 449. The supporting unit 447 is integrally formed with the positing determining unit 451 that determines the position of the vibration mirror board 440 so that the reflective surface of the movable mirror is orthogonalized to the main scanning plane and tilted at a predetermined angle, or 30° according to the second embodiment, from the main scanning direction, and the edge connecting unit 452 that includes a set of metal terminals aligned to bring the wiring terminals 455 formed on one edge of the mounting board 448 of the vibration mirror board into connection when mounted.

The supporting unit 447 is provided with the through hole 444 to emit beams from and receive them on the reflective surface on the back side of the movable mirror 441.

One side of the vibration mirror board 440 is inserted into the edge connecting unit 452 and fitted inside the retaining nail 453. The back of the vibration mirror board is supported with both side surfaces aligned along the position determining unit 451, and the electric wiring is completed.

With such a structure, each vibration mirror board can be individually replaced.

A control IC, a crystal oscillator and the like that drive the vibration mirror are mounted on the circuit board 449, to which power is externally supplied via the connector 454.

Figure 8A:
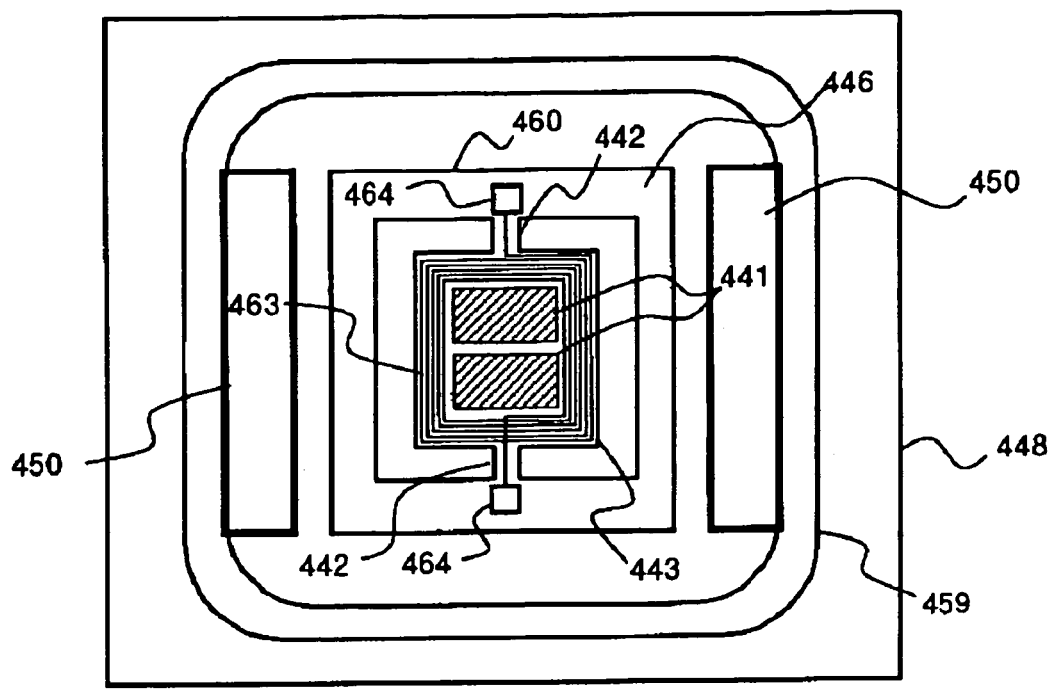
FIGS. 8A and 8B are diagrams for explaining examples of structures of vibration mirror modules.
Figure 8B:
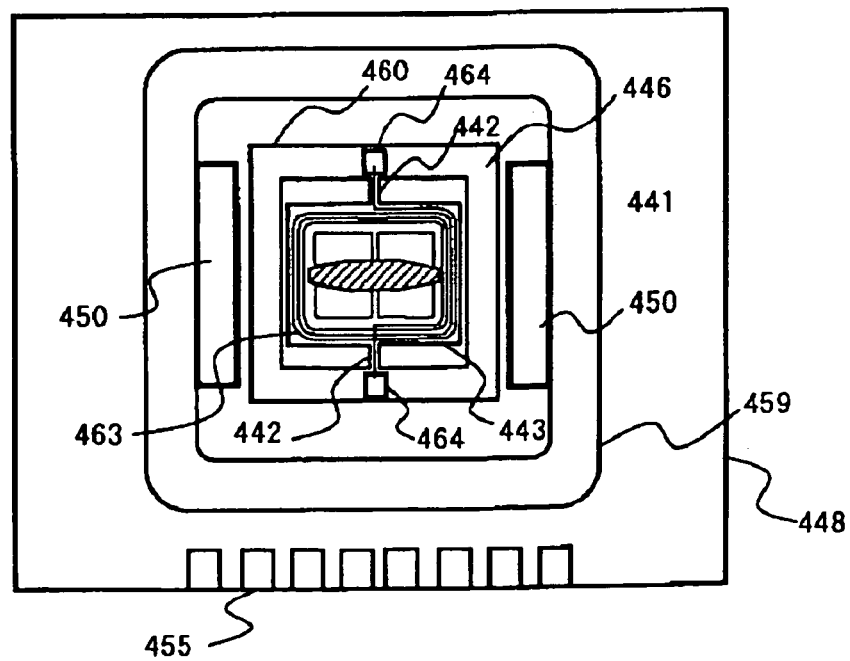

FIGS. 8A and 8B are diagrams for explaining examples of structures of vibration mirror modules. FIG. 8A is a diagram of an example of a two-step mirror, and FIG. 8B is a diagram of an example of a single-step mirror.

Figure 9:
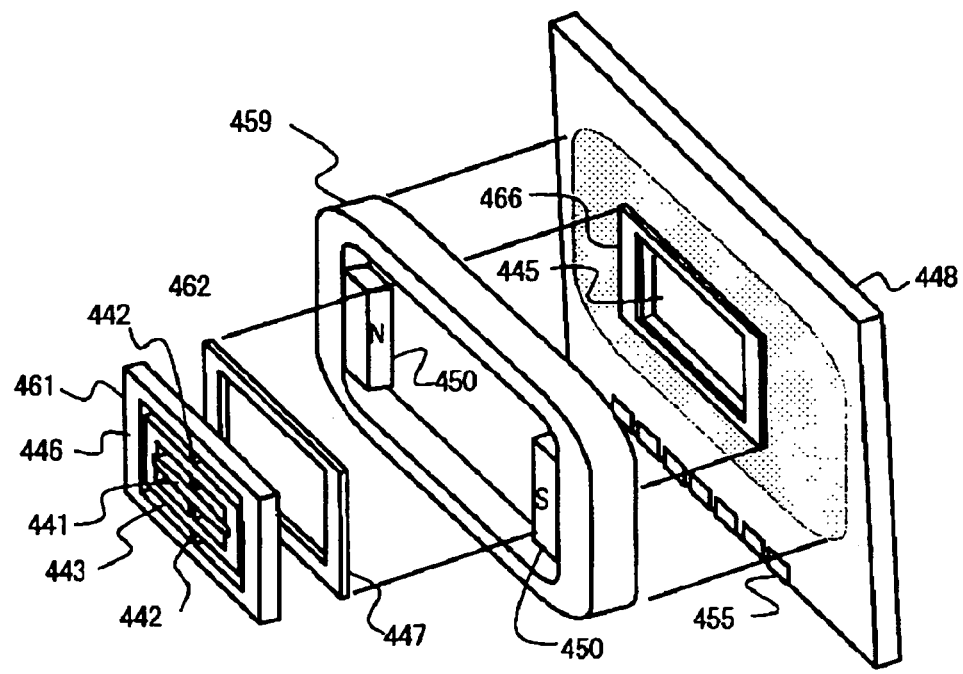
FIG. 9 is an exploded perspective view of a vibration mirror module.

FIG. 9 is an exploded perspective view of a vibration mirror module.

In those drawings, reference numeral 443 designates a vibration board, 445 designates an opening provided in the mounting board, 446 designates a frame, 450 designates permanent magnets, 459 designates a yoke, 460 designates a vibration mirror, 461 designates a first board, 462 designates a second board, 463 designates a coil pattern, 464 designates terminals, and 466 designates a base.

The vibration mirror 460 is prepared by etching a Si wafer in batch processing that employs a series of semiconductor producing processes. After forming multiple movable mirrors at a time, or approximately 150 units from a 6-inch wafer according to the second embodiment, they are separated.

According to the second embodiment, a wafer in which two boards called SOI boards, one having a thickness of 140 micrometers and the other having a thickness of 60 micrometers, sandwich an oxide film and are attached together is used. First, the wafer is pierced from the top surface of the 140-micrometer-thick first board 461 to the oxide film in portions other than the twisting member 442, the vibration board 443 on which a flat coil is formed, the movable mirror 441, and the frame 446, by a dry process using plasma etching.

Next, a diaphragm is formed by anisotropic-etching the 60-micrometer-thick second board 462 from its top surface by use of KOH, for example. Portions other than the supporting unit 447 are pierced to the oxide film, and finally, the oxide film around the movable mirror is removed, and the wafer is cut into vibration mirrors 460.

The vibration board 443 to which the twisting member 442 is connected is formed in a shape of frame so as to surround the movable mirror 441. The vibration board 443 is pierced except the junctions to the extended portion and the end portions of the twisting member 442, and retains the movable mirror 441 to the frame in four positions so that the module can be lightened and the deformation of the vibration board would not affect the movable mirror. The twisting member 442 functions as a rotational axis when the mirror unit vibrates. In this structure, the unit takes a single-axis structure in which one rotational axis is formed for one mirror.

The twisting member 442 has a width of 40 micrometers to 60 micrometers.

Furthermore, reflective surfaces are formed in the regions of the movable mirror 441 on the top and bottom surfaces of the first board 461, with a metal thin film such as an aluminum thin film and a gold thin film or a dielectric multilayered film. The coil pattern 463 is formed of a copper thin film in a region outside the top reflective surface of the first substrate 461, and a terminal 464 is also formed in this region with wiring installed via the twisting member.

The first board may have a reflective surface on one side, or two reflective surfaces on both sides. When there is only one reflective surface, a coil pattern may be formed on the other side, which allows the size of the coil pattern to have a greater degree of freedom. Coil patterns may be provided on both sides, if necessary.

The frame-shaped base 466 for fitting the vibration mirror 460 in and the yoke 459 formed to surround the vibration mirror are provided on the mounting board 448. A pair of permanent magnets 450 are attached to the yoke 459 and arranged to face one side of the movable mirror in such a manner that the south pole of one magnet and the north pole of the other oppose to each other, thereby generating magnetic fields in a direction perpendicular to the rotational axis.

The mounting board 448 has an opening 445 in the center, which also penetrates through the base 466, so that beams can be emitted from and received by the reflective surface at the back.

The vibration mirror 460 is mounted on the base 466 with the second board 462 as a junction surface. Lorentz force is generated on the sides of the coil pattern 463 parallel to the rotational axis when the current flows between the terminals 464. As a result, a torque is generated, twisting the twisting member 442 to rotate the movable mirror 441. When the current is turned off, the movable mirror goes back to the neutral position owing to the recovering properties of the twisting member.

Thus, the movable mirror 441 can be reciprocally vibrated by switching back and forth the direction of the current that flows through the coil pattern 463.

In addition, by bringing the cycle of switching this current closer to the characteristic frequency in the primary vibration mode where the structural body of the movable mirror vibrates with the twisting member as a rotational axis, i.e. resonance frequency f0, the amplitude becomes excited, resulting in a greater scan angle.

For this reason, the scanning frequency fd is usually set to this resonance frequency f0. However, as discussed above, the resonance frequency f0 is determined by the inertia moment I of the movable mirror and string constant K, and fluctuations in finished dimensions cause differences among units. When more than one vibration mirror is used, the scanning frequencies fd cannot coincide with each other.

The fluctuations in the resonance frequencies f0 is in a range of ±200 hertz, although it depends on the processing capabilities. For instance, when the scanning frequency fd=2 kHz, a misalignment equivalent to 1/10 line may occur in scanning line pitch. When 10 lines are recorded, the misalignment may become equivalent to 1 line.

This problem does not arise when a single vibration mirror (a single-axis structure) is employed.

Thus, according to the second embodiment, the scanning frequency fd is set to the frequency shifted by a predetermined value from the resonance frequency f0 within the band of the twist resonance mode, and the scan angles are controlled by adjusting the amount of current that flows into the coil pattern 463.

Figure 10A:
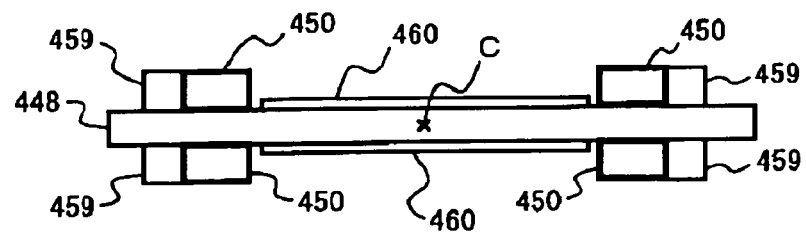
FIGS. 10A and 10B are diagrams of structures in which two vibration mirrors are arranged back-to-back on a board.
Figure 10B:
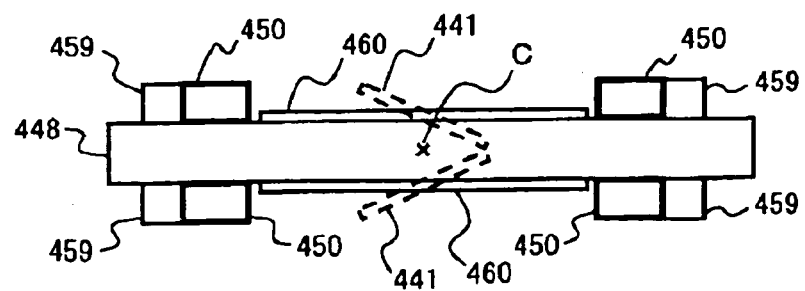

FIGS. 10A and 10B are diagrams of structures in which two vibration mirrors are arranged back-to-back on a board. FIG. 10A is a cross-sectional view, and FIG. 10B is a view of a modification of FIG. 10A.

These structures include two axes.

Vibration mirrors 460 are arranged on both sides of the mounting board 448. The yokes 459 and the permanent magnets 450 are provided to form magnetic circuits. In FIG. 10A, although each of the mirrors on the two sides has a rotational axis, the vibration mirrors are driven basically with their phases coinciding to each other.

On the other hand, when the board is formed to be thick as shown in FIG. 10B, and the arrangement is made to satisfy $\Delta > d \sin \theta$, where the distance between the vibration mirrors is $\Delta$, the width of a vibration mirror in the scanning direction is d, and the scan angle of the mirror is θ. Then, when the vibration mirrors arranged back-to-back vibrate in opposite phases, they are not brought into contact to each other, as illustrated by dashed line. An advantage of driving them in opposite phases resides in that microvibration caused in the mounting board 448 in reaction to the vibration of the mirrors is canceled inside the board and does not propagate outside.

Because the movable mirrors rotate around their own rotational axes in the double-axis structure, the planar center of the entire optical system is a line that passes through the middle point C of the two rotational axes shown in FIGS. 10A and 10B and is parallel to the rotational axes. This line is referred to as the center line of the optical system, for the sake of convenience. In a single-axis structure, the rotational axis itself is the center line of the optical system.

Figure 11:
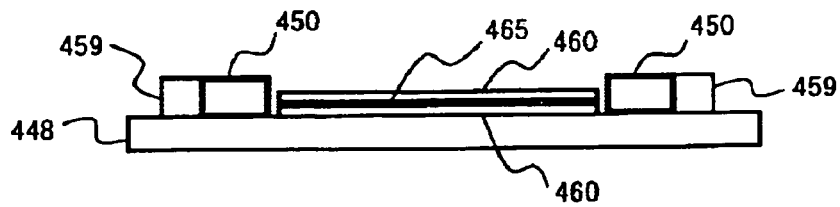
FIG. 11 is a diagram for explaining another example of a structure incorporating two vibration mirrors.

FIG. 11 is a diagram for explaining another example of a structure incorporating two vibration mirrors.

Reference numeral 465 designates a thin spacer.

The structure may be configured to have two vibration mirrors 460 that are arranged back-to-back with the thin spacer (or spacing unit) 465 interposed therebetween, and a magnetic circuit that is formed on one side of the mounting board. In this case, the two vibration mirrors 460 are driven in the same phase.

The vibration mirrors employing Si boards in the above example have flat mirror surfaces that are formed of flat boards parallel to each other. The mirror surfaces do not have to be flat, however, and may be processed by etching or the like to be spherical or aspherical.

Figure 12:
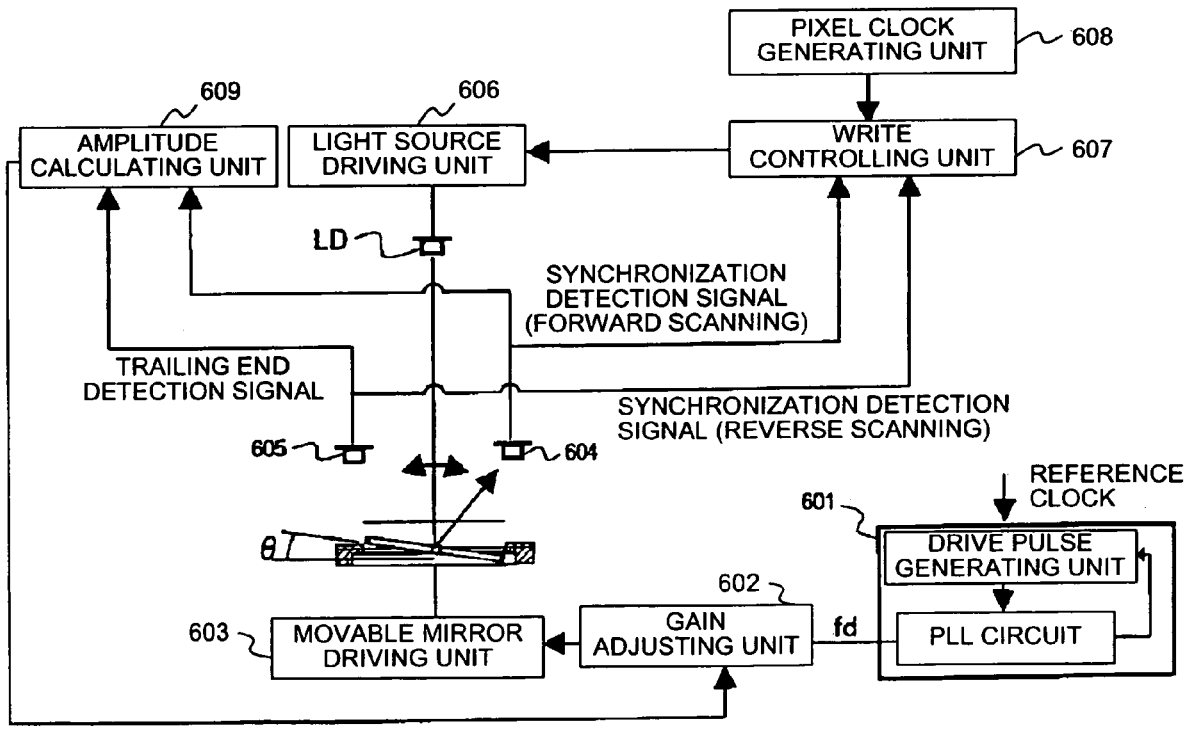
FIG. 12 is a block diagram of a driving circuit that vibrates the movable mirror.

FIG. 12 is a block diagram of a driving circuit that vibrates the movable mirror.

Reference numeral 601 designates a scanning frequency generator, 602 designates a gain adjusting unit, 603 designates a movable mirror driving unit, 604 designates a synchronization detection sensor, 605 designates a trailing end detection sensor, 606 designates a light source driving unit, 607 designates a write controlling unit, 608 designates a pixel crock generating unit, and 609 designates an amplitude calculating unit.

As explained above, an AC voltage or a pulse voltage is applied to the flat coil formed on the vibration mirror so as to switch the current direction back and forth. Then, the vibration mirror is reciprocally vibrated by adjusting the gain of the current to be passed through the flat coil so as to maintain the scan angle θ at a certain angle.

Figure 13:
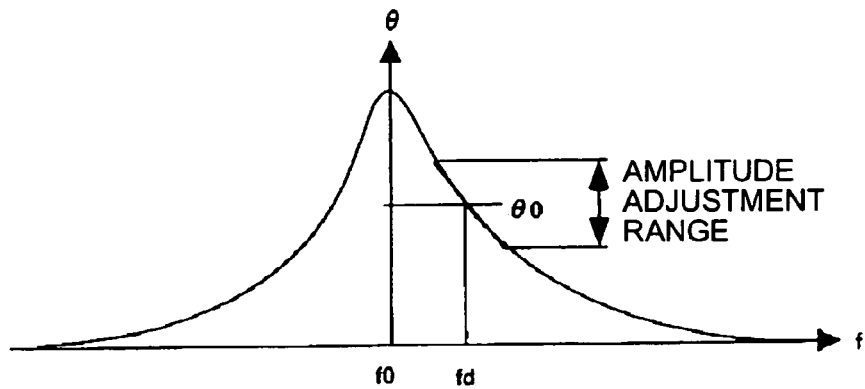
FIG. 13 is a diagram for explaining the relationship between the drive frequency f and the scan angle θ of the vibration mirror.

FIG. 13 is a diagram for explaining the relationship between the drive frequency f and the scan angle θ of the vibration mirror.

In general, the frequency f has a characteristic that the resonance frequency f0 forms its peak. This means that the largest scan angle can be obtained by matching the scanning frequency fd with the resonance frequency f0. However, the scan angle sharply changes in the vicinity of the resonance frequency.

Although it is possible to set the driving frequency applied to the fixed electrode of the drive controlling unit of the movable mirror in the initial stage to mach the resonance frequency, the scan angle rapidly decreases if the resonance frequency varies owing to a change in a spring constant in accordance with a change in temperature. This raises a problem of lacking stability over time.

In conventional technologies, an example of adjusting the scanning frequency fd in accordance with changes in the resonance frequency f0. However, a change in the scanning frequency fd leads to misalignment of a pitch of the scanning line, as explained above. According to the second embodiment, the scanning frequency fd is fixed to a single frequency other than the resonance frequency f0, and the scan angle θ is increased or decreased in accordance with the gain adjustment. It should be noted that, although the scanning frequency fd takes a value other than the resonance frequency f0, the scanning frequency fd is still in the resonant region as long as it stays under the curve.

Specifically, a predetermined value is set to 0.5 kilohertz with respect to the resonance frequency f0 of 2 kilohertz, and thus the scanning frequency fd is set to 2.5 kilohertz. The scan angle θ is controlled to be ±25° by adjusting the gain.

As the process proceeds, the scan angle θ is controlled to be constant by calculating the scan angle θ from the scanning time of the beam moved by the movable mirror between the synchronization detection sensors 604 provided at the leading end and trailing end of the scanning region and the trailing end detection sensor 605.

It should be noted that the scan angle θ of the vibration mirror, which vibrates in resonance, varies in a sine wave form. On the other hand, dots have to be printed at regular intervals in the main scanning direction on a photosensitive drum surface, which is a surface to be scanned.

If the pixel clock is modulated with a single frequency, dot intervals become larger on the scanned surface as the amplitude reaches its peak.

Such displacements in linearity are corrected with a f·arc sin lens, as explained above. However, an effective half field angle ω, or an effective scan angle θd (θd=ω/2) for scanning image areas, is below 50% of the entire scan angle θ.

When the effective half field angle ω decreases, the size of the mirror surface increases, as discussed above. To ensure a sufficient scanning frequency and a sufficient scan angle, it is preferable to achieve as large an effective scan angle θd as possible while the size of the mirror surface is reduced as much as possible.

Thus, according to the second embodiment, a vibration mirror with a scan angle θ=±25° when the scanning frequency fd=2.5 kHz is realized by setting the dimension in a direction perpendicular to the twisting member to 4.5 millimeters and the dimension in a parallel direction to 1 millimeter. Furthermore, electrical corrections are made in addition to corrections by the f·arc sin lens, thereby enhancing the ratio of the effective scan angle θd to the entire scan angle θ (effective scan ratio η) to go beyond 50% and increasing the effective scan angle θd.

More specifically, the phase of each pixel is changed in accordance with a position in the main scanning direction, from a state of being ahead at the write leading end to a state of being delayed at the write trailing end.

As a result, the effective scan angle θd of ±15° is attained.

Figure 14:
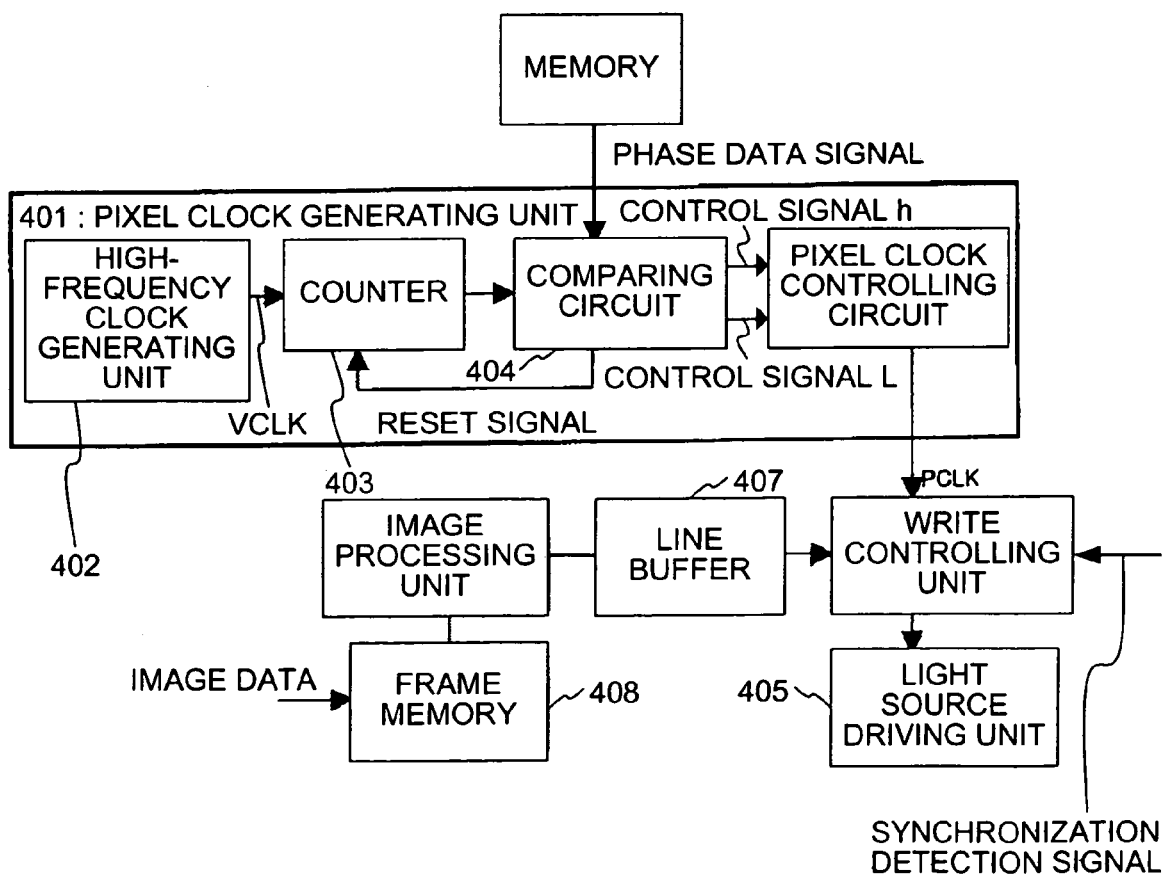
FIG. 14 is a block diagram of a drive circuit that modulates a semiconductor laser, which is a light source.

FIG. 14 is a block diagram of a drive circuit that modulates a semiconductor laser, which is a light source.

Reference numeral 401 designates a pixel clock generating unit, 402 designates a high-frequency clock generating unit, 403 designates a counter, 404 designates a comparing circuit, 405 designates a light source driving unit, 407 designates a line buffer, and 408 designates a frame memory.

Image data that has subjected to raster processing for each color station is individually stored in the frame memory 408. The data is then sequentially read out to the image processing unit, where pixel data for each line is formed in accordance with a matrix pattern that corresponds to the halftone by referring to the relationship with the adjacent lines. The pixel data is sent to the line buffer 407 that correspond to the light source.

The write controlling circuit individually modulates the pixel data that is read from the line buffer 407 with a synchronization detection signal as a trigger.

The synchronization detection signal is output at the beginning of scanning in the forward scanning of the movable mirror at the third and the fourth stations, and at the beginning of scanning in the reverse scanning at the first and the second stations. Images are sequentially written in as the scanning operation reciprocates.

The pixel clock generating unit 401 that modulates luminous points will be explained next.

The counter 403 counts high-frequency clocks VCLK generated by the high-frequency clock generating circuit 402. The comparing circuit 404 compares this count value, a preset value L predetermined based on the duty ratio, and phase data H that is externally provided as a transition timing of the pixel clock and indicates a phase shift amount. When the count value matches the preset value L, the comparing circuit 404 outputs a control signal 1 for indicating the falling edge of the pixel clock PCLK. When the count value matches the phase data H, the comparing circuit 404 outputs a control signal h for indicating the rising edge of the pixel clock PCLK. A sequential pulse train is attained by resetting the counter 403 at the time of outputting the control signal h so that the counter 403 starts counting from 0 again.

Pixel clocks PCLK whose pulse cycles are changed are sequentially generated by providing phase data H for every clock.

According to the second embodiment, a pixel clock PLCK has a one-eighth cycle of the high-frequency clock VCLK so that the phase can vary with resolution equivalent to one-eighth of a clock.

Figure 15:
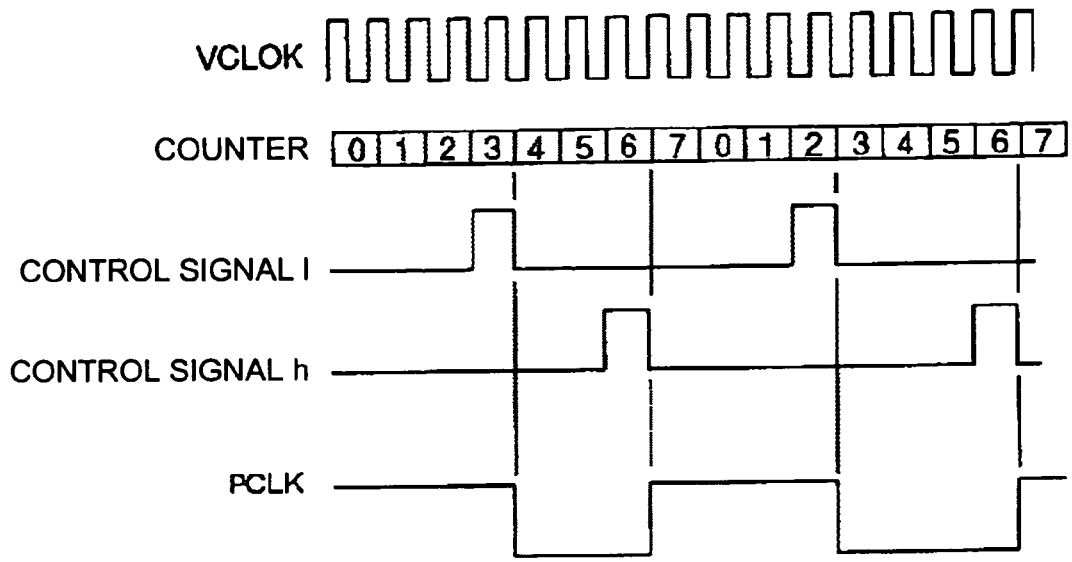
FIG. 15 is a diagram for explaining a process of shifting a phase of an arbitrary pixel.

FIG. 15 is a diagram for explaining a process of shifting a phase of an arbitrary pixel.

In this drawing, an example in which the phase is delayed by one-eighth of a clock is given.

When the duty ratio is 50%, the preset value L=3 is provided. After the counter 403 counts 4, the pixel clock PCLK falls. If the phase is to be delayed by one-eighth of a clock, the phase data H=6 is provided, and the pixel clock PCLK rises after 7 counts. The counter is reset at this time, and the pixel clock PCLK falls again after 4 counts. Hence, the adjacent pulse cycle is reduced by one-eighth of a clock.

The pixel clock PCLK thus generated is supplied to the light source driving unit 405. The semiconductor laser is driven by modulated data prepared by superposing pixel data read from the line buffer 407 onto the pixel clock PCLK.

Figure 16:
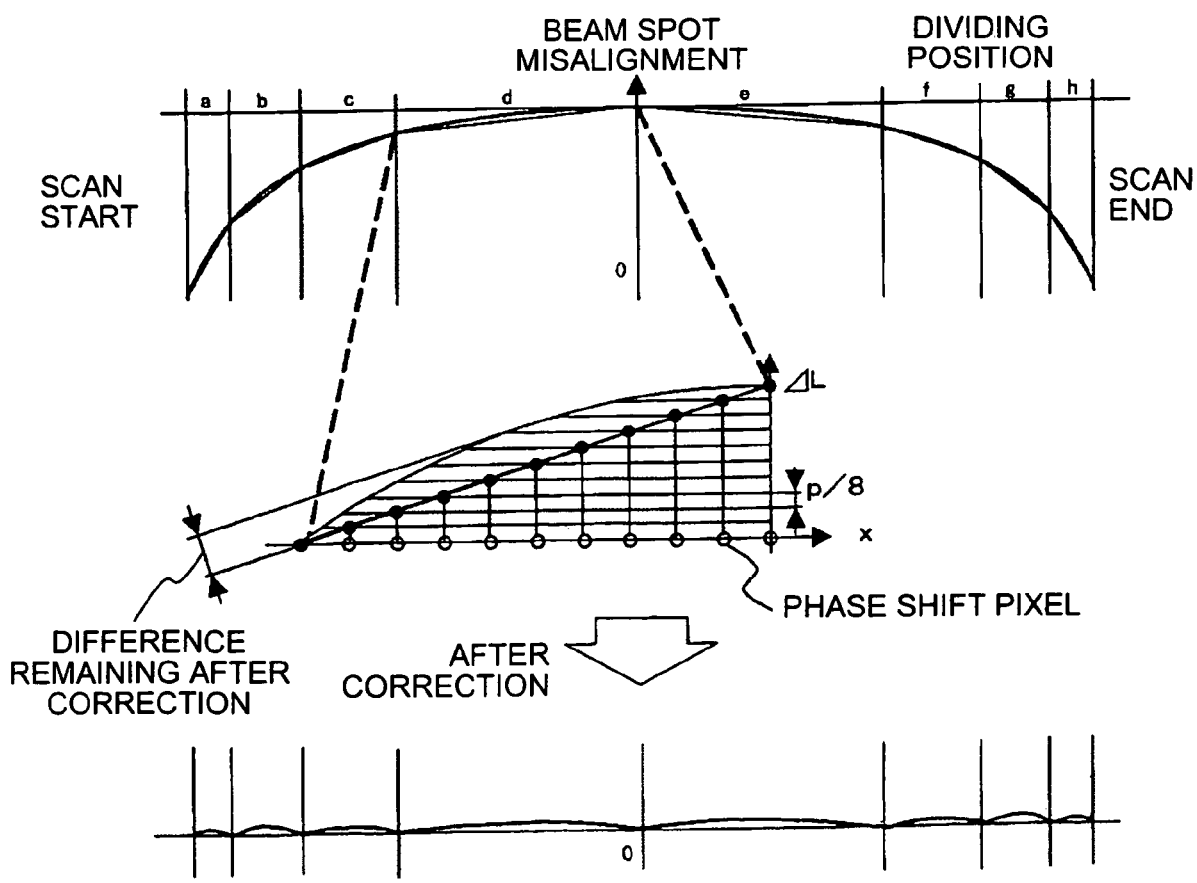
FIG. 16 is a diagram for explaining pixel misalignment that occurs after single-frequency modulation.

FIG. 16 is a diagram for explaining pixel misalignment that occurs after single-frequency modulation.

The main-scanning region is divided into several areas, and the pixel interval n by which the phase for each area is shifted so that there will be no misalignment at the divided positions. According to the second embodiment, the main-scanning region is divided into eight areas in such a manner that areas located nearer to either end of the scanning have smaller widths.

For instance, when each area has the number N of pixels, the phase shift amount for each pixel is one-eighth of a pixel pitch p, which is every one-eighth of a clock, and the misalignment amount at both ends of each area is ΔL, $$n = N \cdot p / 8 \Delta L$$

Thus, the phase should be shifted every n pixels.

Figure 17:
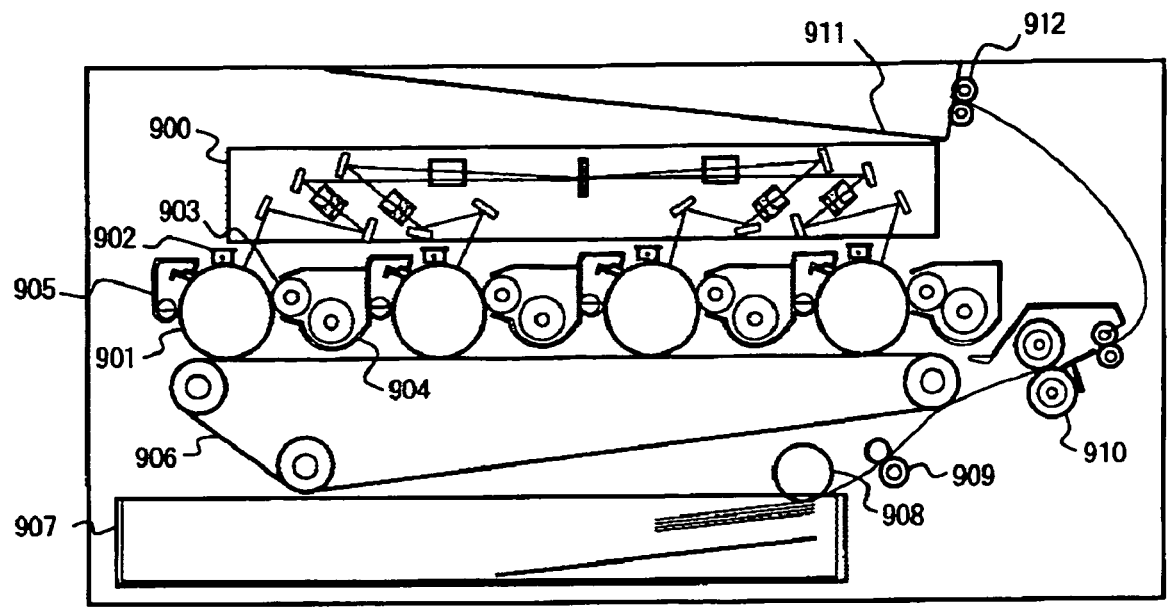
FIG. 17 is a diagram for explaining an image forming apparatus according to a third embodiment of the present invention.
Figure 18:
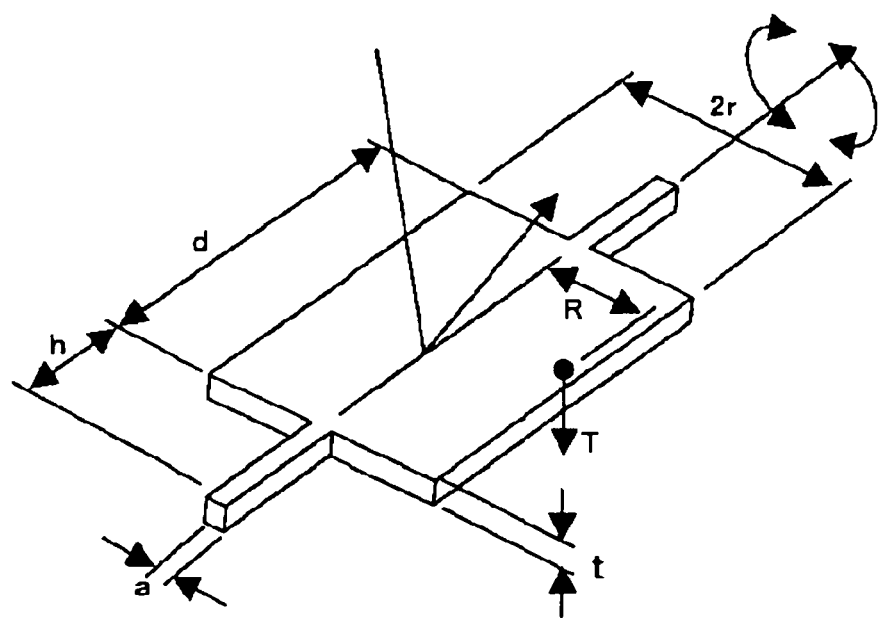
FIG. 18 is a schematic view for explaining an example of the shape of a movable mirror.

FIG. 17 is a diagram for explaining an image forming apparatus according to a third embodiment of the present invention. The image forming apparatus includes the optical scanning device according to the second embodiment.

An electrostatic charger 902 that charges the photosensitive body to a high voltage, a developing roller 903 that applies toner to the charged electrostatic latent image recorded by the optical scanning device 900 to develop the image, and a toner cartridge 904 that supplies toner to the developing roller, a cleaning case 905 that scrapes off the toner remaining on the drum and stores it are arranged around the photosensitive drum 901. Image recording on the photosensitive drum is performed for two lines in one cycle by the reciprocal scanning with the vibration mirror.

The image forming stations are aligned in the transport direction of the transfer belt 906. Toner images of yellow, magenta, cyan, and black are sequentially transferred onto the transfer belt at suitable timings and overlaid to form a color image.

The image forming stations have different toner colors but basically the same structures.

On the other hand, the recording paper is fed from a paper feeding tray 907 to a paper feeding roller 908, and is fed out by a pair of register rollers 909 in accordance with the timing of starting recording in the sub-scanning direction. The toner image is transferred from the transfer belt, fixed by the fixing roller 910, and transporting the paper out to an output tray 911 by a outputting roller 912.

According to embodiments of the present invention, the scanning pitches of different stations coincide with one another, and the scan angles become identical. Moreover, with each station arranged in a position shifted half a cycle from its adjacent stations in such a manner as to face the other station of its pair, the scanning lines of different colors coincide with one another in the scanning direction when forming an image. Because the write start positions are prevented from being misaligned, high-quality color image recording can be achieved without causing color shifts or discoloration.

Furthermore, the embodiments can respond to the fluctuations in resonance frequencies of the movable mirrors. This eliminates cumbersome processes such as screening and trim adjustment, thus enhancing yield and productivity.

Misalignment of write start positions can be further reduced, and high-quality color image recording can be achieved without color shifts or discoloration. In addition, fewer components are required, which reduces the cost and improves assembly efficiency.

The scanning pitches of the stations can be consistent with one another, and the scan angles are identical, which does not create deviations in main-scanning magnifications. In addition, because a pair of opposing stations is configured so that one writes an image in the forward scanning while the other writes an image in the reverse scanning, the scanning lines of different colors coincide in the scanning direction, preventing the write start positions from being misaligned. Thus, high-quality color image recording can be realized without color shifts or discoloration.

Even when a scanning line runs obliquely in accordance with the movement of the photosensitive drum, the scanning lines themselves always stay parallel to one another. Hence, high-quality color image recording can be performed without color shifts or discoloration.

An optical scanning device compliant to the tandem system in which images formed at multiple stations are overlaid can be provided.

With a single image formation optical system shared by a pair of opposing stations, dot intervals of pixels become even in the main scanning direction, allowing for high-quality color image recording.

A stable scan angle can be obtained, or in other words, the main-scan magnification (the scan width in the main scanning direction) can always be maintained, which realizes high-quality color image recording.

A movable mirror with two reflective surfaces formed on its two sides can be produced in a semiconductor producing process that is composed of a step of forming a film on a board surface and a step of etching, and batch processing enables multiple mirrors to be produced at a time. Thus, the productivity can be improved.

With the planar surface of the movable mirror, the beam spot diameter on the scanned surface is consistent, which allows for high-quality color image recording.

Even when the resonance frequency varies under the influence of a temperature change, the main-scan magnification (the scan width in the main scanning direction) stays stable, allowing for high-quality color image recording.

An image forming apparatus that has an advantage of low noise and low power consumption, which can be enjoyed characteristically by a movable mirror using resonant vibrations, while being compliant to the tandem system in which images formed at different stations are overlaid, can be provided. Thus, high-quality color image formation can be realized without color shifts or discoloration.

High-quality image recording can be performed with low noise and low power consumption by incorporating the vibration mirror. In addition, the tandem system that is realized with a single vibration mirror suppresses color shifts and discoloration that are common in a structure with multiple vibration mirrors owing fluctuations in resonance frequencies, and thus high-quality image recording can be achieved.

When more than one vibration mirror is incorporated, the vibration mirrors are arranged back-to-back, requiring a single mounting board only. This means that high-quality image recording can be realized at a low cost.

Because a vibration mirror is easy to process and easy to attain a necessary degree of surface precision and mass production is possible, high-quality recording can be achieved at a low cost.

When a vibration mirror having multiple reflective surfaces whose normal lines are opposite to each other is incorporated in the tandem system, an effective scan width and a constant speed are ensured, allowing for high-quality image recording.

The opposing scanning lenses are arranged in such a manner that the optical axes thereof substantially coincide with each other when viewed from the main scanning direction. Thus, a greater effective scan width can be obtained, which makes it easier to ensure uniformity in speed. As a result, high-quality image recording can be achieved.

The minimum effective diameter of the mirror can be reduced, which contributes to lightening the vibrating unit including the mirror while increasing the vibration amplitude. An excellent spot can thereby be formed on a scanned surface without narrowing the angle of field, and high-quality image recording can be performed.

The embodiments include a beam detecting unit that detects a beam moved for scanning by a vibration mirror, and controls a rotating unit based on the detection result so that the beam detecting unit calculates the scan angle of the vibration mirror. With the feedback control, the scan angle stays constant. Even when there is a change in the environment, the main-scan magnifications (the scan widths in the main scanning direction) can stay consistent between the vibration mirrors. High-quality image recording can thereby be achieved without fluctuations in the magnifications.

The rotating unit provides the vibration mirror with a torque of a cycle that does not correspond to the resonance frequency of the vibration mirror. Thus, the scanning frequency can be determined within a frequency band that does not correspond to the resonance frequency to adjust the scan angle. Even when there are fluctuations in the resonance frequencies in accordance with a change in the environment, the main-scan magnifications (scan widths in the main scanning direction) can stay aligned with each other. Hence, high-quality image recording can be performed without fluctuations in the magnifications.

By scanning and writing in the same direction, the beam spots of the main scanning direction are prevented from being misaligned when the temperature varies. In addition, the intervals of scanning lines become consistent, resulting in high-quality image recording without color shifts and discoloration.

The embodiments can provide an image forming apparatus that can perform image recording of quality as high as with a polygon mirror, while realizing low noise and low power consumption, which are unique to a resonance-type vibration mirror.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a plurality of light sources;
   a deflecting unit that includes a vibration mirror that deflects light beams in specific directions using vibration and has two reflective surfaces including a first reflective surface and a second reflective surface, wherein a direction normal to the first reflective surface face is opposite to a direction normal to the second reflective surface face, the first reflective surface deflecting light beams from a first set of light sources among the light sources and the second reflective surface deflecting light beams from a second set of light sources among the light sources; and
   an image formation optical system that reflects each of the light beams deflected by the deflecting unit to scan a scanning area corresponding to each light beam.

2. The optical scanning device according to claim 1, wherein the vibration mirror includes
   a mirror arrangement having a single plate-like member having two surfaces, and the two reflective surfaces are the two surfaces of the plate-like member; and
   a single twisting member that rotationally supports the mirror arrangement.

3. The optical scanning device according to claim 1, wherein the vibration mirror includes
   a mirror arrangement having a first plate-like member having a first surface and a second surface, and a second plate-like member having a third surface and a fourth surface, the second surface of the first plate-like member being coupled to the third surface of the second plate-like member, and the two reflective surfaces are the first surface of the first plate-like member and the third surface of the second plate-like member; and
   a single twisting member that rotationally supports the mirror arrangement.

4. The optical scanning device according to claim 1, wherein
   the two reflective surfaces are arranged substantially parallel to each other.

5. The optical scanning device according to claim 1, wherein the vibration mirror includes
   a first mirror arrangement having a first plate-like member having a first surface and a second surface;
   a second mirror arrangement having a second plate-like member having a third surface and a fourth surface, wherein the first mirror arrangement and the second mirror arrangement being arranged such that the second surface of the first plate-like member faces toward the third surface of the second plate-like member, and the two reflective surfaces are the first surface of the first plate-like member and the third surface of the second plate-like member;
   a first twisting member that rotationally supports the first mirror arrangement; and
   a second twisting member that rotationally supports the second mirror arrangement.

6. The optical scanning device according to claim 5, wherein
   the two reflective surfaces are arranged substantially parallel to each other when the two reflective surfaces are in neutral positions.

7. The optical scanning device according to claim 1, wherein
   a beam incident on the first reflective surface and a beam incident on the second reflective surface originate from opposite directions.

8. The optical scanning device according to claim 1, wherein
   an optical axis of the beam incident on the first reflective surface and an optical axis of the beam incident on the second reflective surface are symmetric with respect to a center line of an image formation optical system.

9. The optical scanning device according to claim 1, wherein
   an optical axes of the beams incident on the two reflective surfaces cross a center line of an image formation optical system.

10. The optical scanning device according to claim 1, wherein
    at least one of the beams is incident on the at least one of the two reflective surfaces at a predetermined angle with respect to a plane perpendicular to a rotational axis of the deflecting unit.

11. The optical scanning device according to claim 1, wherein deflecting unit includes
    a twisting member that rotatably holds the deflecting unit;
    a vibration plate; and
    a rotating unit that applies a torque to the vibration plate to vibrate the vibration plate.

12. The optical scanning device according to claim 11, wherein
    mirror units of the vibration mirror, which form the reflective surfaces, are separated from each other and supported by partially connecting to the vibration plate.

13. The optical scanning device according to claim 11, wherein the rotating unit includes
    a flat coil formed adjacent to the reflective surfaces; and
    a permanent magnet that forms a magnetic field having a component orthogonal to the rotational axis, and rotates the vibration mirror by controlling a current that flows through the flat coil.

14. The optical scanning device according to claim 11, further comprising a detecting unit that detects the beams used for scanning with the vibration mirror, and
    the rotating unit is controlled based on a result of detection obtained by the detecting unit.

15. The optical scanning device according to claim 1, further comprising:
    a detecting unit that detects the beam reflected by one of the two reflective surfaces; and
    a synchronization signal generator that outputs a synchronization detection signal based on a detection result obtained by the detection unit.

16. The optical scanning device according to claim 15, wherein
    the synchronization signal generator generates the synchronization detection signal for every half of a cycle of the vibration mirror to write images by the beams.

17. The optical scanning device according to claim 1, further comprising:

a detecting unit that detects the beam reflected by one of the two reflective surfaces in a plurality of positions along a main scanning direction; and a scan-angle controller that controls scan angle of the vibration mirror based on a detection result obtained by the detecting unit.

18. The optical scanning device according to claim 1, wherein a scanning frequency is within a resonance frequency band of the vibration mirror.

19. The optical scanning device according to claim 18, wherein the scanning frequency of the vibration mirror is displaced from a resonance frequency by a predetermined value.

20. The optical scanning device according to claim 1, wherein the beam deflected by the first reflective surface writes an image during forward scanning of the vibration mirror, while the beam deflected by the second reflection surface writes an image during reverse scanning of the vibration mirror.

21. An image forming apparatus comprising:

optical scanning device according to claim 1, wherein the beams emitted from the light sources and modulated with an image signal are deflected to form an image in a spot pattern by the image formation optical system, an image carrier is scanned to record an electrostatic image thereon, and the electrostatic image is developed with a toner and transferred onto a recording medium.

22. An image forming apparatus comprising:

the optical scanning device according to claim 1, further comprising:

an image carrier corresponding to each light beam, each image carrier having the scanning area corresponding to each light beam and records an electrostatic image corresponding to the light beam;

a developing device that develops the electrostatic images on the image carriers with toners of different colors; and a transferring device that superimposes developed toner images developed by the developing device and transfers the developed toner images onto a recording medium, wherein the images are recorded in such a manner that write starting positions on the image carriers are aligned in a main scanning direction.

* * * * *